(12) United States Patent
Orr et al.

(10) Patent No.: US 10,956,486 B2
(45) Date of Patent: Mar. 23, 2021

(54) INTELLIGENT AUTOMATED ASSISTANT FOR MEDIA SEARCH AND PLAYBACK

(71) Applicant: Apple Inc., Cupertino, CA (US)

(72) Inventors: Ryan M. Orr, Cupertino, CA (US); Raumi N. Sidki, Cupertino, CA (US); Patrick M. Lister, Cupertino, CA (US); Jonathan H. Russell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/526,751

(22) Filed: Jul. 30, 2019

(65) Prior Publication Data

US 2019/0354548 A1    Nov. 21, 2019

Related U.S. Application Data

(63) Continuation of application No. 14/963,089, filed on Dec. 8, 2015, now Pat. No. 10,740,384.

(Continued)

(51) Int. Cl.
*G06F 16/48* (2019.01)
*G06F 3/16* (2006.01)
(Continued)

(52) U.S. Cl.
CPC .............. *G06F 16/48* (2019.01); *G06F 3/048* (2013.01); *G06F 3/167* (2013.01);
(Continued)

(58) Field of Classification Search
CPC ...... G06F 3/048; G06F 3/167; G06F 16/3328; G06F 16/483; G06F 40/40; H04N 5/4403; H04N 21/42204
See application file for complete search history.

(56) References Cited

U.S. PATENT DOCUMENTS 5,737,734 A    4/1998 Schultz
5,802,515 A *  9/1998 Adar ................. G06F 16/334
                                            707/723

(Continued)

FOREIGN PATENT DOCUMENTS

CN    104584010 A    4/2015
EP      1675025 A2   6/2006
(Continued)

OTHER PUBLICATIONS

Office Action received for Chinese Patent Application No. 201680057538.3, dated Apr. 2, 2020, 18 pages (11 pages of English Translation and 7 pages of Official Copy).

(Continued)

*Primary Examiner* — Eric J. Bycer
(74) *Attorney, Agent, or Firm* — Dentons US LLP

(57) ABSTRACT

Systems and processes are disclosed for operating a digital assistant in a media environment. In an example process, a primary set of media items can be displayed. An audio input containing a media-related request can be received. A primary user intent corresponding to the media-related request can be determined. In accordance with a determination that the primary user intent comprises a user intent to narrow the primary media search query, a second primary media search query corresponding to the primary user intent can be generated. The second primary media search query can be based on the media-related request and the primary media search query. The second primary media search query can be performed to obtain a second primary set of media items. Display of the primary set of media items can be replaced with display of the second primary set of media items.

45 Claims, 18 Drawing Sheets

Related U.S. Application Data

(60) Provisional application No. 62/215,575, filed on Sep. 8, 2015.

(51) Int. Cl.

| | | |
|---|---|---|
| *G06F 16/438* | (2019.01) | |
| *H04N 21/41* | (2011.01) | |
| *H04N 21/422* | (2011.01) | |
| *H04N 21/482* | (2011.01) | |
| *G10L 15/22* | (2006.01) | |
| *G06F 16/332* | (2019.01) | |
| *G06F 40/40* | (2020.01) | |
| *G10L 15/26* | (2006.01) | |
| *G06F 3/048* | (2013.01) | |

(52) U.S. Cl.
CPC ........ *G06F 16/3329* (2019.01); *G06F 16/438* (2019.01); *G06F 40/40* (2020.01); *G10L 15/22* (2013.01); *G10L 15/26* (2013.01); *H04N 21/4126* (2013.01); *H04N 21/41265* (2020.08); *H04N 21/42203* (2013.01); *H04N 21/42204* (2013.01); *H04N 21/4828* (2013.01); *G10L 2015/221* (2013.01); *H04N 21/42206* (2013.01); *H04N 21/42222* (2013.01); *H04N 21/42224* (2013.01)

(56) References Cited

U.S. PATENT DOCUMENTS

| | | | |
|---|---|---|---|
| 6,766,320 | B1 | 7/2004 | Wang et al. |
| 6,862,713 | B1 | 3/2005 | Kraft et al. |
| 7,603,349 | B1 | 10/2009 | Kraft et al. |
| 8,285,737 | B1 | 10/2012 | Lynn et al. |
| 8,346,757 | B1 | 1/2013 | Lamping et al. |
| 8,514,197 | B2 | 8/2013 | Shahraray et al. |
| 9,063,979 | B2 | 6/2015 | Chiu et al. |
| 2003/0171914 | A1* | 9/2003 | Jung .................. G06F 16/3338 704/7 |
| 2005/0097092 | A1* | 5/2005 | Annau .................. G06F 16/338 |
| 2006/0101504 | A1* | 5/2006 | Aravamudan ... H04N 21/42204 725/136 |
| 2006/0106762 | A1 | 5/2006 | Caracas et al. |
| 2006/0129531 | A1 | 6/2006 | Bates |
| 2006/0190436 | A1 | 8/2006 | Richardson et al. |
| 2007/0060114 | A1 | 3/2007 | Ramer et al. |
| 2007/0174790 | A1 | 7/2007 | Jing et al. |
| 2008/0256055 | A1* | 10/2008 | Cloward ............... G06F 16/951 |
| 2008/0288460 | A1 | 11/2008 | Poniatowski et al. |
| 2009/0228474 | A1 | 9/2009 | Chiu et al. |
| 2010/0066684 | A1 | 3/2010 | Shahraray et al. |
| 2010/0318357 | A1* | 12/2010 | Istvan ................ H04N 21/4223 704/251 |
| 2011/0077943 | A1 | 3/2011 | Miki et al. |
| 2011/0123004 | A1 | 5/2011 | Chang et al. |
| 2011/0282906 | A1 | 11/2011 | Wong |
| 2011/0289530 | A1* | 11/2011 | Dureau .................. G06F 16/78 725/38 |
| 2012/0233207 | A1 | 9/2012 | Mohajer |
| 2012/0304239 | A1 | 11/2012 | Shahraray et al. |
| 2013/0151339 | A1 | 6/2013 | Kim et al. |
| 2013/0174034 | A1 | 7/2013 | Brown et al. |
| 2013/0179172 | A1 | 7/2013 | Nakamura et al. |
| 2014/0008163 | A1 | 1/2014 | Mikonaho et al. |
| 2014/0028029 | A1 | 1/2014 | Jochman |
| 2014/0081633 | A1* | 3/2014 | Badaskar ................ G06F 3/167 704/235 |
| 2014/0156279 | A1 | 6/2014 | Okamoto et al. |
| 2014/0163962 | A1 | 6/2014 | Castelli et al. |
| 2014/0214537 | A1 | 7/2014 | Yoo et al. |
| 2014/0244263 | A1* | 8/2014 | Pontual ............ H04N 21/42207 704/260 |
| 2014/0278349 | A1 | 9/2014 | Grieves et al. |
| 2014/0280292 | A1 | 9/2014 | Skinder |
| 2015/0025405 | A1 | 1/2015 | Vairavan et al. |
| 2015/0039606 | A1* | 2/2015 | Salaka ................ G06F 16/3326 707/730 |
| 2015/0186154 | A1 | 7/2015 | Brown et al. |
| 2015/0254057 | A1* | 9/2015 | Klein ............... H04N 21/42222 704/275 |
| 2015/0310114 | A1 | 10/2015 | Ryger et al. |
| 2015/0339391 | A1 | 11/2015 | Kang et al. |
| 2017/0068670 | A1 | 3/2017 | Orr et al. |

FOREIGN PATENT DOCUMENTS

| | | |
|---|---|---|
| JP | 2013-140520 A | 7/2013 |
| JP | 2014-109889 A | 6/2014 |
| KR | 2000-0069024 A | 11/2000 |
| WO | 2011/088053 A2 | 7/2011 |
| WO | 2014/028797 A1 | 2/2014 |
| WO | 2014/047047 A1 | 3/2014 |

OTHER PUBLICATIONS

Decision to Grant received for European Patent Application No. 16760246.5, dated Jan. 23, 2020, 2 pages.

"DIRECTV™ Voice", Now Part of the DIRECTTV Mobile App for Phones, Sep. 18, 2013, 5 pages.

Google Developers, "Voice search in your app", Available online at: https://www.youtube.com/watch?v=PS1FbB5qWEI, Nov. 12, 2014, 1 page.

Office Action received for Chinese Patent Application No. 201680057538.3, dated Sep. 3, 2020, 7 pages (3 pages of English Translation and 4 pages of Official Copy).

\* cited by examiner

INTELLIGENT AUTOMATED ASSISTANT FOR MEDIA SEARCH AND PLAYBACK

CROSS-REFERENCE TO RELATED APPLICATIONS

This application is a continuation of U.S. patent application Ser. No. 14/963,089, filed on Dec. 8, 2015, and entitled "Intelligent Automated Assistant for Media Search and Playback," which claims priority from U.S. Provisional Ser. No. 62/215,575, filed on Sep. 8, 2015, and entitled "Intelligent Automated Assistant for Media Search and Playback." The content of both applications are hereby incorporated by reference in their entirety for all purposes.

This application relates to the following co-pending applications: U.S. Non-Provisional patent application Ser. No. 14/963,094, "Intelligent Automated Assistant in a Media Environment," filed Dec. 8, 2015, U.S. Non-Provisional patent application Ser. No. 14/498,503, "Intelligent Automated Assistant for TV User Interactions," filed Sep. 26, 2014, and U.S. Non-Provisional patent application Ser. No. 14/498,391, "Real-time Digital Assistant Knowledge Updates," filed Sep. 26, 2014, which are hereby incorporated by reference in their entirety for all purposes.

FIELD

This relates generally to intelligent automated assistants and, more specifically, to intelligent automated assistants for media search and playback.

BACKGROUND

Intelligent automated assistants (or digital assistants) can provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device, and, in some examples, a relevant output can be returned to the user in natural language form.

Integrating digital assistants in a media environment (e.g., televisions, television set-top boxes, cable boxes, gaming devices, streaming media devices, digital video recorders, etc.) can be desirable to assist users with tasks related to media consumption. For example, a digital assistant can be utilized to assist with searching for desirable media content to consume. However, users are often not clear with regard to the specific media item they wish to consume and may spend a considerable amount of time browsing media items to discover new and interesting content. Further, existing search interfaces can be complicated and not user friendly, which can further increase the time a user spends browsing media items before ultimately selecting a desired item to consume.

SUMMARY

Systems and processes are disclosed for operating a digital assistant in a media environment. In an example process, a primary set of media items can be displayed on a display unit. In response to detecting a user input, audio input can be received. The audio input can contain a media-related request in natural language speech form. A primary user intent corresponding to the media-related request can be determined. The process can determine whether the primary user intent comprises a user intent to narrow a primary media search query corresponding to the primary set of media items. In accordance with a determination that the primary user intent comprises a user intent to narrow the primary media search query, a second primary media search query corresponding to the primary user intent can be generated. The second primary media search query can be based on the media-related request and the primary media search query. The second primary media search query can be performed to obtain a second primary set of media items. Display of the primary set of media items on the display unit can be replaced with display of the second primary set of media items.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This disclosure relates to systems and processes for operating a digital assistant in a media environment. In one example process, a media search request in natural language speech form can be received. A primary user intent corresponding to the media search request can be determined. A primary set of media items can be obtained in accordance with the primary user intent. The process can determine whether one or more previous user intents exist, where the one or more previous user intents corresponds to one or more previous media search requests received prior to the media search request. In response to determining that one or more previous user intents exist, one or more secondary user intents can be determined based on the primary user intent and the one or more previous user intents. The one or more secondary user intents can be based on various other factors such as media browsing history, related search attributes, and popular media attributes among a plurality of users. A plurality of secondary sets of media items can be obtained, where each secondary set of media items corresponds to a respective secondary user intent of the one or more secondary user intents. The obtained primary set of media items and the plurality of secondary sets of media items can be displayed, via a user interface, on a display unit for user selection. The primary and secondary user intents can be intelligently determined to increase the probability of predicting the user's actual intent. By providing a variety of media items based on primary and secondary user intents, a user can be more likely to come across media items that pique the user's interest. This can be desirable for improving user experience by decreasing the amount of time spent browsing for media items and subsequently increasing the amount of time spent enjoying media content.

1. System and Environment

Figure 1:
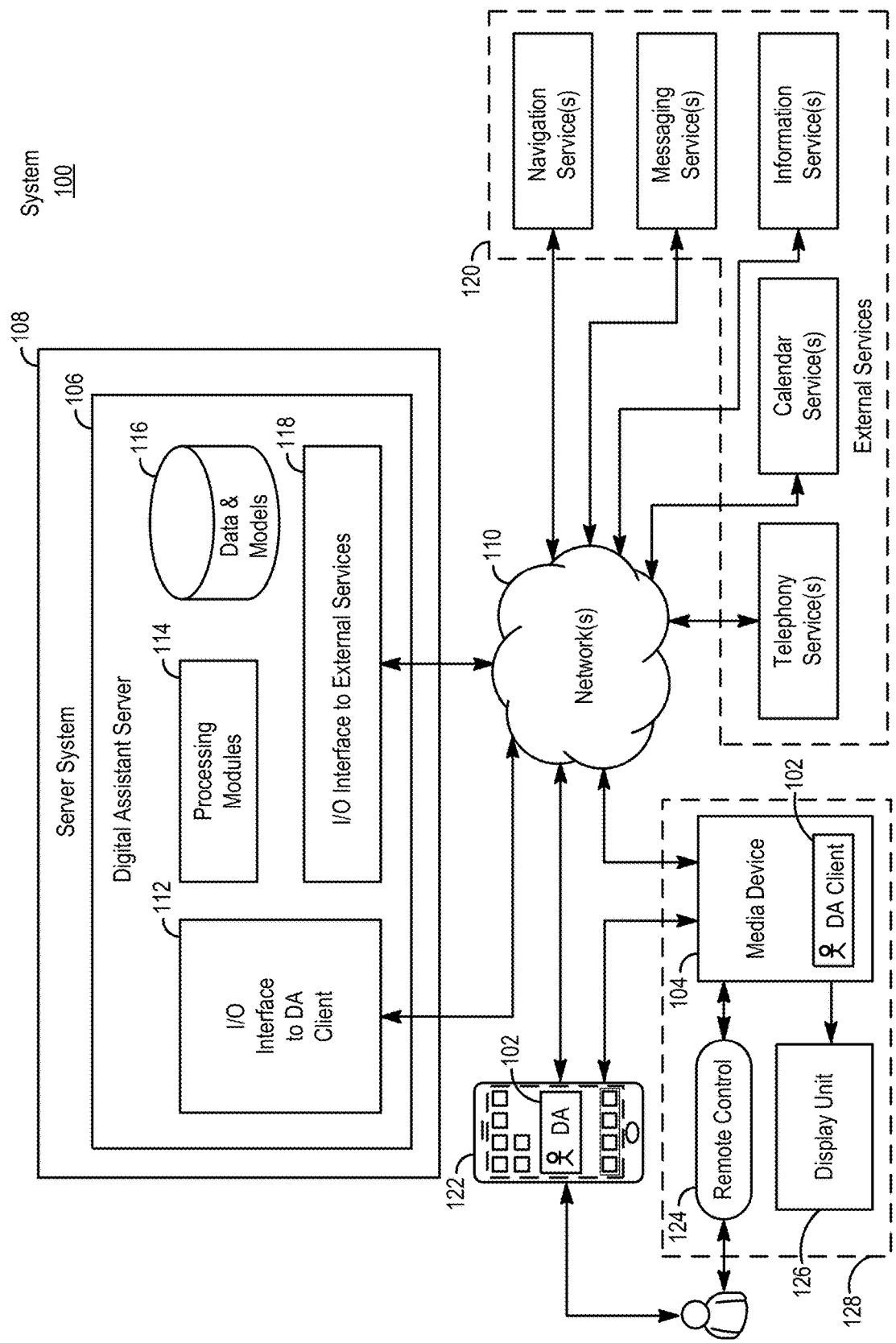
FIG. 1 is a block diagram illustrating a system and environment for implementing a digital assistant according to various examples.

FIG. 1 illustrates exemplary system 100 for operating a digital assistant according to various examples. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, application programming interfaces (APIs), or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "What time is it in Paris?" The digital assistant can retrieve the requested information and respond, "It's 4:00 PM in Paris." The user can also request the performance of a task, for example, "Find movies starring Reese Witherspoon." In response, the digital assistant can perform the requested search query and display relevant movie titles for the user to select from. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing text responses and taking programmed actions, the digital assistant can also provide responses in other visual or audio forms, e.g., as verbal, alerts, music, images, videos, animations, etc. Moreover, as discussed herein, an exemplary digital assistant can control playback of media content (e.g., on a television set-top box) and cause media content or other information to be displayed on a display unit (e.g., a television).

As shown in FIG. 1, in some examples, a digital assistant can be implemented according to a client-server model. The digital assistant can include client-side portion 102 (hereafter "DA client 102") executed on media device 104 and server-side portion 106 (hereafter "DA server 106") executed on server system 108. Further, in some examples, the client-side portion can also be executed on user device 122. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102, each residing on a respective device (e.g., media device 104 and user device 122).

Media device 104 can be any suitable electronic device that is configured to manage and control media content. For example, media device 104 can include television set-top box, such as a cable box device, satellite box device, video player device, video streaming device, digital video recorder, gaming system, DVD player, Blu-ray Disc™ Player, a combination of such devices, or the like. As shown in FIG. 1, media device 104 can be part of media system 128. In addition to media device 104, media system 128 can include remote control 124 and display unit 126. Media device 104 can display media content on display unit 126. Display unit 126 can be any type of display, such as a television display, monitor, projector, or the like. In some examples, media device 104 can connect to an audio system (e.g., audio receiver), and speakers (not shown) that can be integrated with or separate from display unit 126. In other examples, display unit 126 and media device 104 can be incorporated together in a single device, such as a smart television with advanced processing and network connectivity capabilities. In such examples, the functions of media device 104 can be executed as an application on the combined device.

In some examples, media device 104 can function as a media control center for multiple types and sources of media content. For example, media device 104 can facilitate user access to live television (e.g., over-the-air, satellite, or cable TV). As such, media device 104 can include cable tuners, satellite tuners, or the like. In some examples, media device 104 can also record TV programs for later time-shifted viewing. In other examples, media device 104 can provide access to one or more streaming media services, such as cable-delivered on-demand TV shows, videos, and music as well as internet-delivered TV shows, videos, and music (e.g., from various free, paid, and subscription-based streaming services). In still other examples, media device 104 can facilitate playback or display of media content from any other source, such as displaying photos from a mobile user device, playing videos from a coupled storage device, playing music from a coupled music player, or the like. Media device 104 can also include various other combinations of the media control features discussed herein, as desired. A detailed description of media device 104 is provided below with reference to FIG. 2.

User device 122 can be any personal electronic device, such as a mobile phone (e.g., smartphone), tablet computer, portable media player, desktop computer, laptop computer, PDA, wearable electronic device (e.g., digital glasses, wristband, wristwatch, brooch, armband, etc.), or the like. A detailed description of user device 122 is provided below with reference to FIG. 3.

In some examples, a user can interact with media device 104 through user device 122, remote control 124, or interface elements integrated with media device 104 (e.g., buttons, a microphone, a camera, a joystick, etc.). For example, speech input including media-related queries or commands for the digital assistant can be received at user device 122 and/or remote control 124, and the speech input can be used to cause media-related tasks to be executed on media device 104. Likewise, tactile commands for controlling media on media device 104 can be received at user device 122 and/or remote control 124 (as well as from other devices not shown). The various functions of media device 104 can thus be controlled in a variety of ways, giving users multiple options for controlling media content from multiple devices.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), BLUETOOTH, Wi-Fi, voice over Internet Protocol (VoIP), Wi-MAX, or any other suitable communication protocol.

DA server 106 can include client-facing input/output (I/O) interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 can perform task execution based on inferred user intent. In some examples, DA server 106 can communicate with external services 120, such as telephony services, calendar services, information services, messaging services, navigation services, television programming services, streaming media services, media search services, and the like, through network(s) 110 for task completion or information acquisition. I/O interface to external services 118 can facilitate such communications.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device or a media device. In addition, the divisions of functionalities between the client and server portions of the digital assistant can vary in different implementations. For instance, in some examples, the DA client executed on user device 122 or media device 104 can be a thin client that provides only user-facing input and output processing functions, and delegates all other functionalities of the digital assistant to a backend server.

2. Media System

Figure 2:
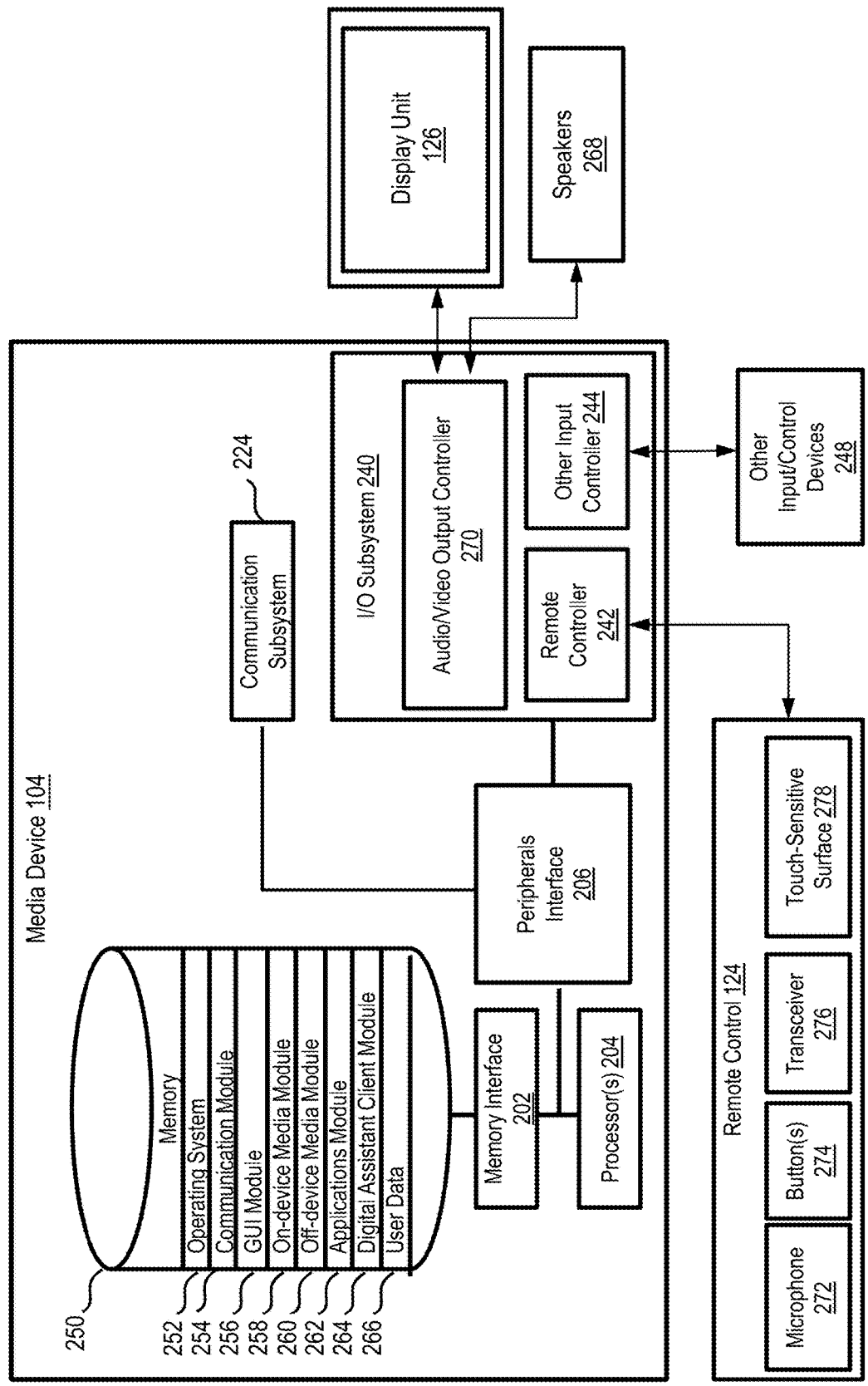
FIG. 2 is a block diagram illustrating a media system according to various examples.

FIG. 2 illustrates a block diagram of media system 128 according to various examples. Media system 128 can include media device 104 that is communicatively coupled to display unit 126, remote control 124, and speakers 268. Media device 104 can receive user input via remote control 124. Media content from media device 104 can be displayed on display unit 126.

In the present example, as shown in FIG. 2, media device 104 can include memory interface 202, one or more processors 204, and a peripherals interface 206. The various components in media device 104 can be coupled together by one or more communication buses or signal lines. Media device 104 can further include various subsystems and peripheral devices that are coupled to the peripherals interface 206. The subsystems and peripheral devices can gather information and/or facilitate various functionalities of media device 104.

For example, media device 104 can include a communication subsystem 224. Communication functions can be facilitated through one or more wired and/or wireless communication subsystems 224, which can include various communication ports, radio frequency receivers and transmitters, and/or optical (e.g., infrared) receivers and transmitters.

In some examples, media device 104 can further include an I/O subsystem 240 coupled to peripherals interface 206. I/O subsystem 240 can include an audio/video output controller 270. Audio/video output controller 270 can be coupled to display unit 126 and speakers 268 or can otherwise provide audio and video output (e.g., via audio/video ports, wireless transmission, etc.). I/O subsystem 240 can further include remote controller 242. Remote controller 242 can be communicatively coupled to remote control 124 (e.g., via a wired connection, BLUETOOTH, Wi-Fi, etc.).

Remote control 124 can include microphone 272 for capturing audio data (e.g., speech input from a user), button(s) 274 for capturing tactile input, and transceiver 276 for facilitating communication with media device 104 via remote controller 242. Further, remote control 124 can include a touch-sensitive surface 278, sensor, or set of sensors that accepts input from the user based on haptic and/or tactile contact. Touch-sensitive surface 278 and remote controller 242 can detect contact (and any movement or breaking of the contact) on touch-sensitive surface 278 and convert the detected contact (e.g., gestures, contact motions, etc.) into interaction with user-interface objects (e.g., one or more soft keys, icons, web pages, or images) that are displayed on display unit 126. In some examples, remote control 124 can also include other input mechanisms, such as a keyboard, joystick, or the like. In some examples, remote control 124 can further include output mechanisms, such as lights, a display, a speaker, or the like. Input received at remote control 124 (e.g., user speech, button presses, contact motions, etc.) can be communicated to media device 104 via remote control 124. I/O subsystem 240 can also include other input controller(s) 244. Other input controller(s) 244 can be coupled to other input/control devices 248, such as one or more buttons, rocker switches, a thumb-wheel, an infrared port, a USB port, and/or a pointer device, such as a stylus.

In some examples, media device 104 can further include a memory interface 202 coupled to memory 250. Memory 250 can include any electronic, magnetic, optical, electromagnetic, infrared, or semiconductor system, apparatus, or device; a portable computer diskette (magnetic); a random access memory (RAM) (magnetic); a read-only memory (ROM) (magnetic); an erasable programmable read-only memory (EPROM) (magnetic); a portable optical disc such as CD, CD-R, CD-RW, DVD, DVD-R, or DVD-RW; or flash memory such as compact flash cards, secured digital cards, USB memory devices, memory sticks, and the like. In some examples, a non-transitory computer-readable storage medium of memory 250 can be used to store instructions (e.g., for performing portions or all of the various processes described herein) for use by or in connection with an instruction execution system, apparatus, or device, such as a computer-based system, processor-containing system, or other system that can fetch the instructions from the instruction execution system, apparatus, or device, and can execute the instructions. In other examples, the instructions (e.g., for performing portions or all of the various processes described herein) can be stored on a non-transitory computer-readable storage medium of server system 108, or can be divided between the non-transitory computer-readable storage medium of memory 250 and the non-transitory computer-readable storage medium of server system 108. In the context of this document, a "non-transitory computer-readable storage medium" can be any non-transitory medium that can contain or store the program for use by or in connection with the instruction execution system, apparatus, or device.

In some examples, memory 250 can store an operating system 252, a communication module 254, a graphical user interface (GUI) module 256, an on-device media module 258, an off-device media module 260, and an applications module 262. Operating system 252 can include instructions for handling basic system services and for performing hardware-dependent tasks. Communication module 254 can facilitate communicating with one or more additional devices, one or more computers, and/or one or more servers. Graphical user interface module 256 can facilitate graphical user interface processing. On-device media module 258 can facilitate storage and playback of media content stored locally on media device 104. Off-device media module 260 can facilitate streaming playback or download of media content obtained from an external source (e.g., on a remote server, on user device 122, etc.). Further, off-device media module 260 can facilitate receiving broadcast and cable content (e.g., channel tuning). Applications module 262 can facilitate various functionalities of media-related applications, such as web browsing, media processing, gaming, and/or other processes and functions.

As described herein, memory 250 can also store client-side digital assistant instructions (e.g., in a digital assistant client module 264) and various user data 266 (e.g., user-specific vocabulary data, preference data, and/or other data such as the user's media search history, media watch list, recently watched list, favorite media items, etc.) to, for example, provide the client-side functionalities of the digital assistant. User data 266 can also be used in performing speech recognition in support of the digital assistant or for any other application.

In various examples, digital assistant client module 264 can be capable of accepting voice input (e.g., speech input), text input, touch input, and/or gestural input through various user interfaces (e.g., I/O subsystem 240 or the like) of media device 104. Digital assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, digital assistant client module 264 can communicate with the digital assistant server (e.g., DA server 106) using communication subsystem 224.

In some examples, digital assistant client module 264 can utilize the various subsystems and peripheral devices to gather additional information related to media device 104 and from the surrounding environment of media device 104 to establish a context associated with a user, the current user interaction, and/or the current user input. Such context can also include information from other devices, such as from user device 122. In some examples, digital assistant client module 264 can provide the contextual information or a subset thereof with the user input to the digital assistant server to help infer the user's intent. The digital assistant can also use the contextual information to determine how to prepare and deliver outputs to the user. The contextual information can further be used by media device 104 or server system 108 to support accurate speech recognition.

In some examples, the contextual information that accompanies the user input can include sensor information, such as lighting, ambient noise, ambient temperature, distance to another object, and the like. The contextual information can further include information associated with the physical state of media device 104 (e.g., device location, device temperature, power level, etc.) or the software state of media device 104 (e.g., running processes, installed applications, past and present network activities, background services, error logs, resources usage, etc.). The contextual information can further include information received from the user (e.g., speech input), information requested by the user, and information presented to the user (e.g., information currently or previously displayed by the media device). The contextual information can further include information associated with the state of connected devices or other devices associated with the user (e.g., content displayed on user device 122, playable content on user device 122, etc.). Any of these types of contextual information can be provided to DA server 106 (or used on media device 104 itself) as contextual information associated with a user input.

In some examples, digital assistant client module 264 can selectively provide information (e.g., user data 266) stored on media device 104 in response to requests from DA server 106. Additionally or alternatively, the information can be used on media device 104 itself in executing speech recognition and/or digital assistant functions. Digital assistant client module 264 can also elicit additional input from the user via a natural language dialogue or other user interfaces upon request by DA server 106. Digital assistant client module 264 can pass the additional input to DA server 106 to help DA server 106 in intent inference and/or fulfillment of the user's intent expressed in the user request.

In various examples, memory 250 can include additional instructions or fewer instructions. Furthermore, various functions of media device 104 can be implemented in hardware and/or in firmware, including in one or more signal processing and/or application specific integrated circuits.

3. User Device

Figure 3:
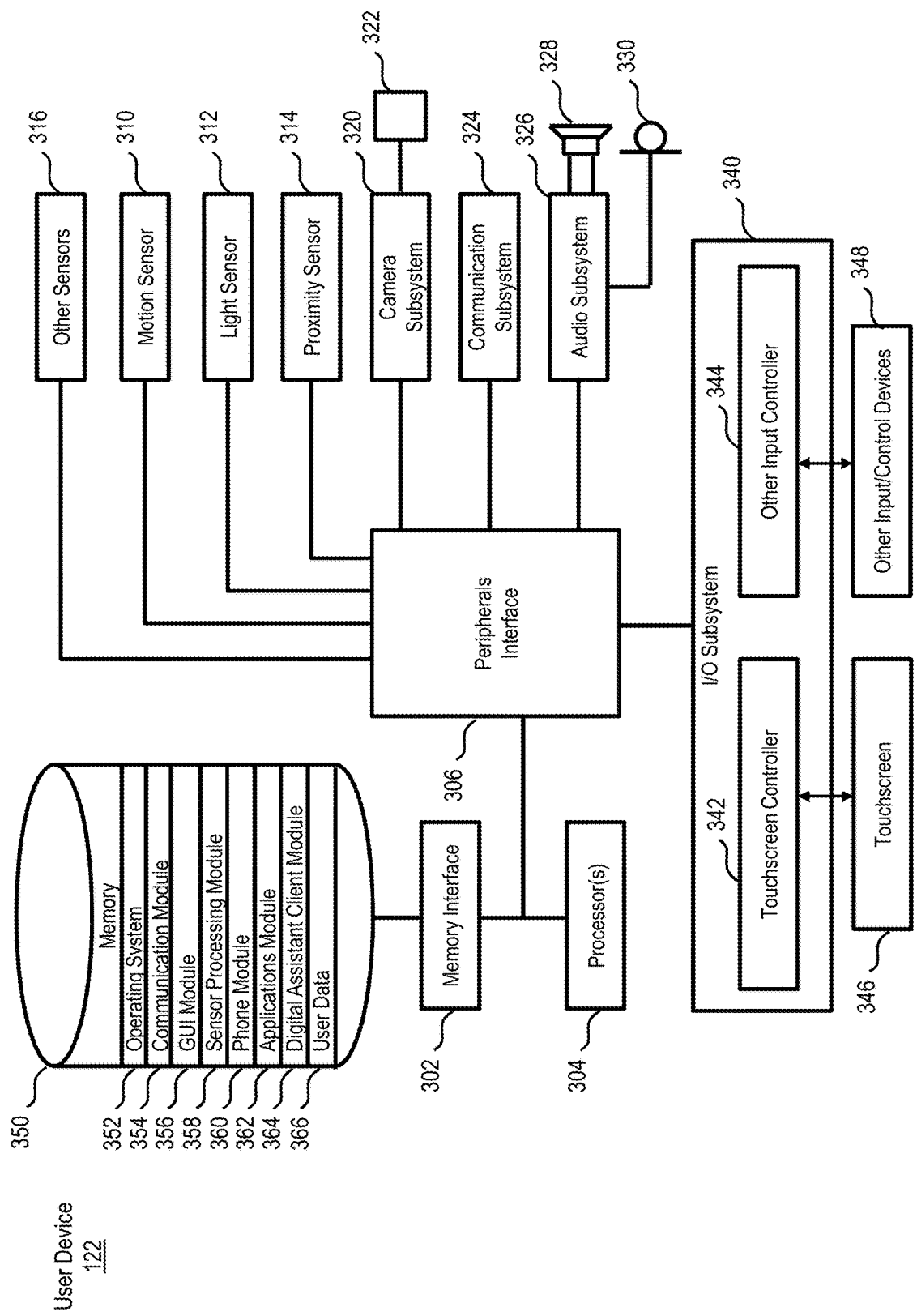
FIG. 3 is a block diagram illustrating a user device according to various examples.

FIG. 3 illustrates a block diagram of exemplary user device 122 according to various examples. As shown, user device 122 can include a memory interface 302, one or more processors 304, and a peripherals interface 306. The various components in user device 122 can be coupled together by one or more communication buses or signal lines. User device 122 can further include various sensors, subsystems, and peripheral devices that are coupled to the peripherals interface 306. The sensors, subsystems, and peripheral devices can gather information and/or facilitate various functionalities of user device 122.

For example, user device 122 can include a motion sensor 310, a light sensor 312, and a proximity sensor 314 coupled to peripherals interface 306 to facilitate orientation, light, and proximity-sensing functions. One or more other sensors 316, such as a positioning system (e.g., a GPS receiver), a temperature sensor, a biometric sensor, a gyroscope, a compass, an accelerometer, and the like, can also be connected to peripherals interface 306, to facilitate related functionalities.

In some examples, a camera subsystem 320 and an optical sensor 322 can be utilized to facilitate camera functions, such as taking photographs and recording video clips. Communication functions can be facilitated through one or more wired and/or wireless communication subsystems 324, which can include various communication ports, radio frequency receivers and transmitters, and/or optical (e.g., infrared) receivers and transmitters. An audio subsystem 326 can be coupled to speakers 328 and microphone 330 to facilitate voice-enabled functions, such as voice recognition, voice replication, digital recording, and telephony functions.

In some examples, user device 122 can further include an I/O subsystem 340 coupled to peripherals interface 306. I/O subsystem 340 can include a touchscreen controller 342 and/or other input controller(s) 344. Touchscreen controller 342 can be coupled to a touchscreen 346. Touchscreen 346 and the touchscreen controller 342 can, for example, detect contact and movement or break thereof using any of a plurality of touch-sensitivity technologies, such as capacitive, resistive, infrared, and surface acoustic wave technologies; proximity sensor arrays; and the like. Other input controller(s) 344 can be coupled to other input/control devices 348, such as one or more buttons, rocker switches, a thumb-wheel, an infrared port, a USB port, and/or a pointer device, such as a stylus.

In some examples, user device 122 can further include a memory interface 302 coupled to memory 350. Memory 350 can include any electronic, magnetic, optical, electromagnetic, infrared, or semiconductor system, apparatus, or device; a portable computer diskette (magnetic); a random access memory (RAM) (magnetic); a read-only memory (ROM) (magnetic); an erasable programmable read-only memory (EPROM) (magnetic); a portable optical disc such as CD, CD-R, CD-RW, DVD, DVD-R, or DVD-RW; or flash memory such as compact flash cards, secured digital cards, USB memory devices, memory sticks, and the like. In some examples, a non-transitory computer-readable storage medium of memory 350 can be used to store instructions (e.g., for performing portions or all of the various processes described herein) for use by or in connection with an instruction execution system, apparatus, or device, such as a computer-based system, processor-containing system, or other system that can fetch the instructions from the instruction execution system, apparatus, or device, and can execute the instructions. In other examples, the instructions (e.g., for performing portions or all of the various processes described herein) can be stored on a non-transitory computer-readable storage medium of server system 108, or can be divided between the non-transitory computer-readable storage medium of memory 350 and the non-transitory computer-readable storage medium of server system 108. In the context of this document, a "non-transitory computer-readable storage medium" can be any non-transitory medium that can contain or store the program for use by or in connection with the instruction execution system, apparatus, or device.

In some examples, memory 350 can store an operating system 352, a communication module 354, a graphical user interface (GUI) module 356, a sensor processing module 358, a phone module 360, and an applications module 362. Operating system 352 can include instructions for handling basic system services and for performing hardware-dependent tasks. Communication module 354 can facilitate communicating with one or more additional devices, one or more computers, and/or one or more servers. Graphical user interface module 356 can facilitate graphical user interface processing. Sensor processing module 358 can facilitate sensor-related processing and functions. Phone module 360 can facilitate phone-related processes and functions. Applications module 362 can facilitate various functionalities of user applications, such as electronic messaging, web browsing, media processing, navigation, imaging, and/or other processes and functions.

As described herein, memory 350 can also store client-side digital assistant instructions (e.g., in a digital assistant client module 364) and various user data 366 (e.g., user-specific vocabulary data, preference data, and/or other data such as the user's electronic address book, to-do lists, shopping lists, television program favorites, etc.) to, for example, provide the client-side functionalities of the digital assistant. User data 366 can also be used in performing speech recognition in support of the digital assistant or for any other application. Digital assistant client module 364 and user data 366 can be similar or identical to digital assistant client module 264 and user data 266, respectively, as described above with reference to FIG. 2.

In various examples, memory 350 can include additional instructions or fewer instructions. Furthermore, various functions of user device 122 can be implemented in hardware and/or in firmware, including in one or more signal processing and/or application-specific integrated circuits.

In some examples, user device 122 can be configured to control aspects of media device 104. For example, user device 122 can function as a remote control (e.g., remote control 124. User input received via user device 122 can be transmitted (e.g., using communication subsystem) to media device 104 to cause corresponding actions to be performed by media device 104. In addition, user device 122 can be configured to receive instructions from media device 104. For example, media device 104 can hand off tasks to user device 122 to perform and cause objects (e.g., selectable affordances) to be displayed on user device 122.

It should be understood that system 100 and media system 128 are not limited to the components and configuration shown in FIG. 1 and FIG. 2, and user device 122, media device 104, and remote control 124 are likewise not limited to the components and configuration shown in FIG. 2 and FIG. 3. System 100, media system 128, user device 122, media device 104, and remote control 124 can all include fewer or other components in multiple configurations according to various examples.

4. Digital Assistant System

Figure 4A:
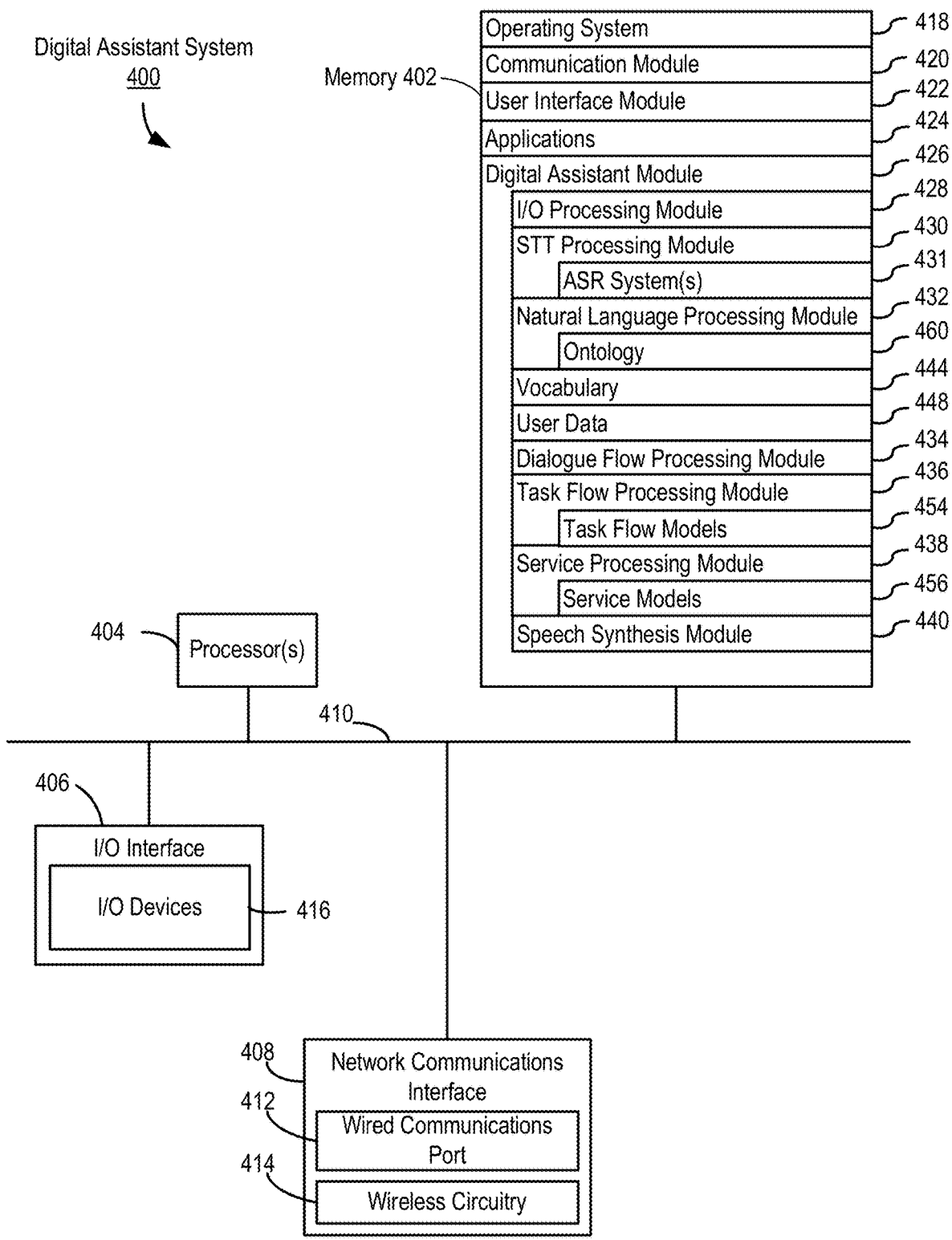
FIG. 4A is a block diagram illustrating a digital assistant system or a server portion thereof according to various examples.

FIG. 4A illustrates a block diagram of digital assistant system 400 in accordance with various examples. In some examples, digital assistant system 400 can be implemented on a standalone computer system. In some examples, digital assistant system 400 can be distributed across multiple computers. In some examples, some of the modules and functions of the digital assistant can be divided into a server portion and a client portion, where the client portion resides on one or more user devices (e.g., devices 104 or 122) and communicates with the server portion (e.g., server system 108) through one or more networks, e.g., as shown in FIG. 1. In some examples, digital assistant system 400 can be an implementation of server system 108 (and/or DA server 106) shown in FIG. 1. It should be noted that digital assistant system 400 is only one example of a digital assistant system, and that digital assistant system 400 can have more or fewer components than shown, may combine two or more components, or may have a different configuration or arrangement of the components. The various components shown in FIG. 4A can be implemented in hardware, software instructions for execution by one or more processors, firmware, including one or more signal processing and/or application-specific integrated circuits, or a combination thereof.

Digital assistant system 400 can include memory 402, one or more processors 404, I/O interface 406, and network communications interface 408. These components can communicate with one another over one or more communication buses or signal lines 410.

In some examples, memory 402 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 406 can couple I/O devices 416 of digital assistant system 400, such as displays, keyboards, touch screens, and microphones, to user interface module 422. I/O interface 406, in conjunction with user interface module 422, can receive user inputs (e.g., voice input, keyboard inputs, touch inputs, etc.) and process them accordingly. In some examples, e.g., when the digital assistant is implemented on a standalone user device, digital assistant system 400 can include any of the components and I/O communication interfaces described with respect to devices 104 or 122 in FIG. 2 or 3, respectively. In some examples, digital assistant system 400 can represent the server portion of a digital assistant implementation, and can interact with the user through a client-side portion residing on a client device (e.g., devices 104 or 122).

In some examples, the network communications interface 408 can include wired communication port(s) 412 and/or wireless transmission and reception circuitry 414. The wired communication port(s) can receive and send communication signals via one or more wired interfaces, e.g., Ethernet, Universal Serial Bus (USB), FIREWIRE, etc. The wireless circuitry 414 can receive and send RF signals and/or optical signals from/to communications networks and other communications devices. The wireless communications can use any of a plurality of communications standards, protocols, and technologies, such as GSM, EDGE, CDMA, TDMA, BLUETOOTH, Wi-Fi, VoIP, Wi-MAX, or any other suitable communication protocol. Network communications interface 408 can enable communication between digital assistant system 400 with networks, such as the Internet, an intranet, and/or a wireless network, such as a cellular telephone network, a wireless local area network (LAN), and/or a metropolitan area network (MAN), and other devices.

In some examples, memory 402, or the computer-readable storage media of memory 402, can store programs, modules, instructions, and data structures including all or a subset of: operating system 418, communication module 420, user interface module 422, one or more applications 424, and digital assistant module 426. In particular, memory 402, or the computer-readable storage media of memory 402, can store instructions for performing process 800, described below. One or more processors 404 can execute these programs, modules, and instructions, and can read/write from/to the data structures.

Operating system 418 (e.g., DARWIN, RTXC, LINUX, UNIX, IOS, OS X, WINDOWS, or an embedded operating system such as VXWORKS) can include various software components and/or drivers for controlling and managing general system tasks (e.g., memory management, storage device control, power management, etc.) and facilitates communications between various hardware, firmware, and software components.

Communications module 420 can facilitate communications between digital assistant system 400 with other devices over network communications interface 408. For example, communications module 420 can communicate with the communication subsystems (e.g., 224, 324) of electronic devices (e.g., 104, 122). Communications module 420 can also include various components for handling data received by wireless circuitry 414 and/or wired communications port 412.

User interface module 422 can receive commands and/or inputs from a user via I/O interface 406 (e.g., from a keyboard, touchscreen, pointing device, controller, and/or microphone), and generate user interface objects on a display. User interface module 422 can also prepare and deliver outputs (e.g., speech, sound, animation, text, icons, vibrations, haptic feedback, light, etc.) to the user via the I/O interface 406 (e.g., through displays, audio channels, speakers, touch-pads, etc.).

Applications 424 can include programs and/or modules that are configured to be executed by one or more processors 404. For example, if digital assistant system 400 is implemented on a standalone user device, applications 424 can include user applications, such as games, a calendar application, a navigation application, or an email application. If digital assistant system 400 is implemented on a server, applications 424 can include resource management applications, diagnostic applications, or scheduling applications, for example.

Memory 402 can also store digital assistant module 426 (or the server portion of a digital assistant). In some examples, digital assistant module 426 can include the following sub-modules, or a subset or superset thereof: I/O processing module 428, speech-to-text (STT) processing module 430, natural language processing module 432, dialogue flow processing module 434, task flow processing module 436, service processing module 438, and speech synthesis module 440. Each of these modules can have access to one or more of the following systems or data and models of the digital assistant module 426, or a subset or superset thereof: ontology 460, vocabulary index 444, user data 448, task flow models 454, service models 456, and automatic speech recognition (ASR) systems 431.

In some examples, using the processing modules, data, and models implemented in digital assistant module 426, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 4B:
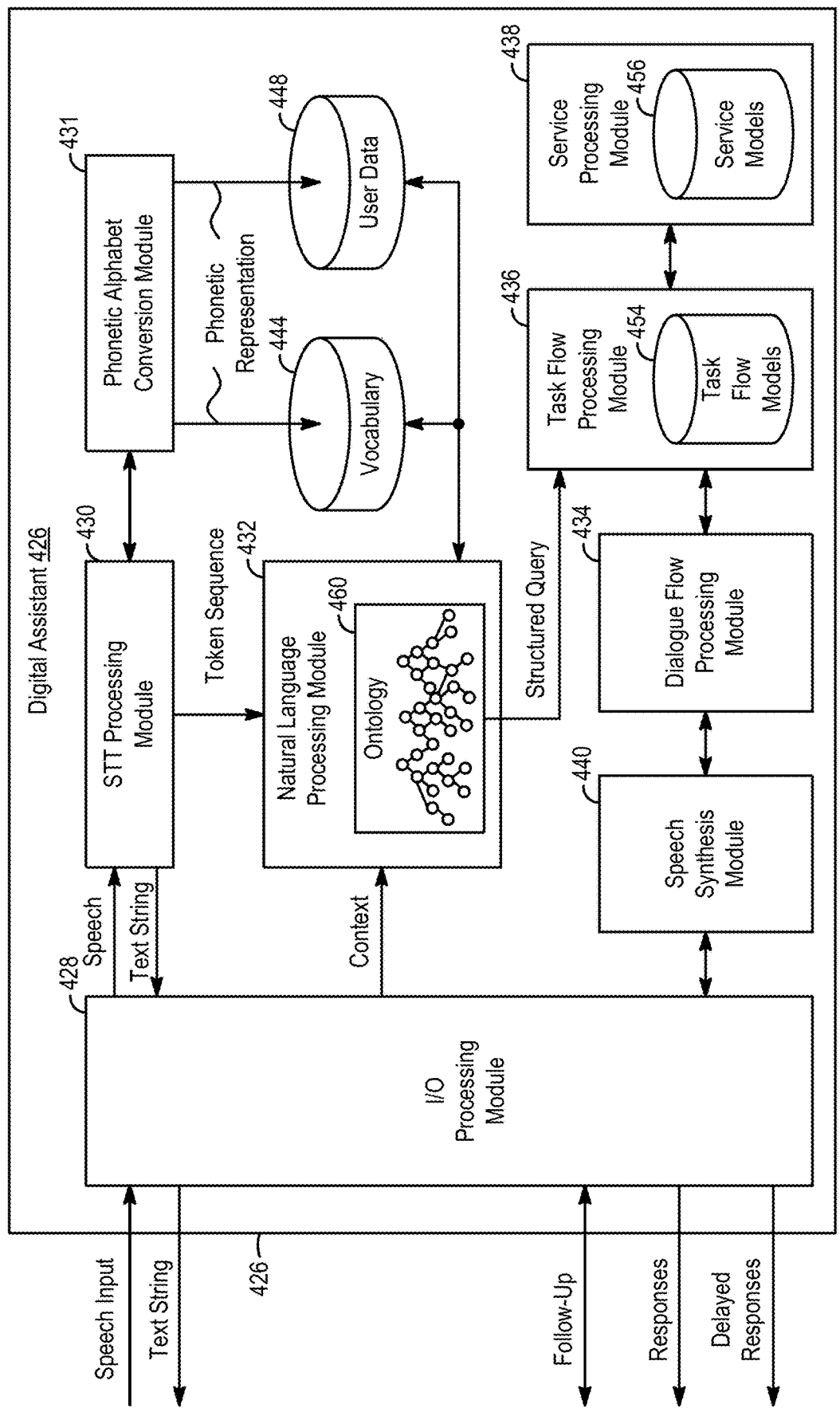
FIG. 4B illustrates the functions of the digital assistant shown in FIG. 4A according to various examples.

In some examples, as shown in FIG. 4B, I/O processing module 428 can interact with the user through I/O devices 416 in FIG. 4A or with an electronic device (e.g., devices 104 or 122) through network communications interface 408 in FIG. 4A to obtain user input (e.g., a speech input) and to provide responses (e.g., as speech outputs) to the user input. I/O processing module 428 can optionally obtain contextual information associated with the user input from the electronic device, along with or shortly after the receipt of the user input. The contextual information can include user-specific data, vocabulary, and/or preferences relevant to the user input. In some examples, the contextual information also includes software and hardware states of the electronic device at the time the user request is received, and/or information related to the surrounding environment of the user at the time that the user request was received. In some examples, I/O processing module 428 can also send follow-up questions to, and receive answers from, the user regarding the user request. When a user request is received by I/O processing module 428 and the user request can include speech input, I/O processing module 428 can forward the speech input to STT processing module 430 (or speech recognizer) for speech-to-text conversions.

STT processing module 430 can include one or more ASR systems (e.g., ASR systems 431). The one or more ASR systems can process the speech input that is received through I/O processing module 428 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the electronic device (e.g., device 104 or 122) to produce the recognition result. Once STT processing module 430 produces recognition results containing a text string (e.g., words, sequence of words, or sequence of tokens), the recognition result can be passed to natural language processing module 432 for intent deduction.

In some examples, one or more language models of the one or more ASR systems can be configured to be biased toward media-related results. In one example, the one or more language models can be trained using a corpus of media-related text. In another example, the ASR system can be configured to favor media-related recognition results. In some examples, the one or more ASR systems can include static and dynamic language models. Static language models can be trained using general corpuses of text, while dynamic language models can be trained using user-specific text. For example, text corresponding to previous speech input received from users can be used to generate dynamic language models. In some examples, the one or more ASR systems can be configured to generate recognition results that are based on static language models and/or dynamic language models. Further, in some examples, the one or more ASR systems can be configured to favor recognition results that correspond to previous speech input that is more recently received.

Additional details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 430 can include and/or access a vocabulary of recognizable words via phonetic alphabet conversion module 431. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of / tə'matoʊ/ and / tə'mɑtoʊ /. Further, vocabulary words can be associated with custom candidate pronunciations that are based on previous speech inputs from the user. Such custom candidate pronunciations can be stored in STT processing module 430 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation / tə'matoʊ / can be ranked higher than / tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation / tə'matoʊ/ can be associated with the United States, whereas the candidate pronunciation / tə'mɑtoʊ / can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation / tə'matoʊ/ (associated with the United States) can be ranked higher than the candidate pronunciation / tə'mɑtoʊ / (associated with Great Britain). In some examples, one of the ranked candidate pronunciations can be selected as a predicted pronunciation (e.g., the most likely pronunciation).

When a speech input is received, STT processing module 430 can be used to determine the phonemes corresponding to the speech input (e.g., using an acoustic model), and can then attempt to determine words that match the phonemes (e.g., using a language model). For example, if STT processing module 430 can first identify the sequence of phonemes / tə'matoʊ/ corresponding to a portion of the speech input, it can then determine, based on vocabulary index 444, that this sequence corresponds to the word "tomato."

In some examples, STT processing module 430 can use approximate matching techniques to determine words in an utterance. Thus, for example, the STT processing module 430 can determine that the sequence of phonemes / tə'matoʊ / corresponds to the word "tomato," even if that particular sequence of phonemes is not one of the candidate sequence of phonemes for that word.

Natural language processing module 432 ("natural language processor") of the digital assistant can take the sequence of words or tokens ("token sequence") generated by STT processing module 430, and attempt to associate the token sequence with one or more "actionable intents" recognized by the digital assistant. An "actionable intent" can represent a task that can be performed by the digital assistant, and can have an associated task flow implemented in task flow models 454. The associated task flow can be a series of programmed actions and steps that the digital assistant takes in order to perform the task. The scope of a digital assistant's capabilities can be dependent on the number and variety of task flows that have been implemented and stored in task flow models 454, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 430, natural language processing module 432 can also receive contextual information associated with the user request, e.g., from I/O processing module 428. The natural language processing module 432 can optionally use the contextual information to clarify, supplement, and/or further define the information contained in the token sequence received from STT processing module 430. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 460. Ontology 460 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 460 can define how a parameter represented by the property node pertains to the task represented by the actionable intent node.

Figure 4C:
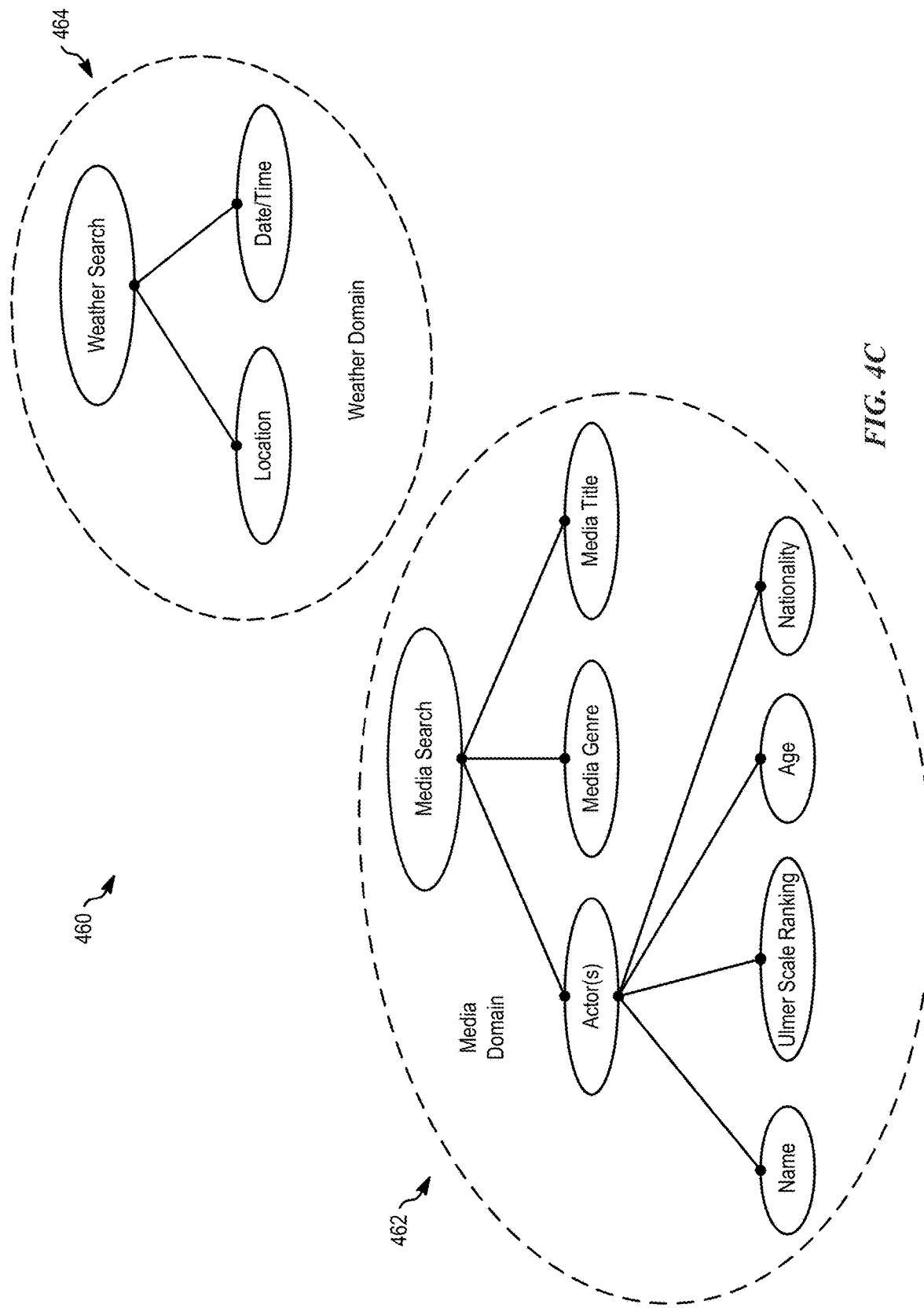
FIG. 4C illustrates a portion of an ontology according to various examples.

In some examples, ontology 460 can be made up of actionable intent nodes and property nodes. Within ontology 460, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 4C, ontology 460 can include a "media" node (i.e., an actionable intent node). Property nodes "actor(s)," "media genre," and "media title," can each be directly linked to the actionable intent node (i.e., the "media search" node). In addition, property nodes "name," "age," "Ulmer scale ranking," and "nationality" can be sub-nodes of the property node "actor."

In another example, as shown in FIG. 4C, ontology 460 can also include a "weather" node (i.e., another actionable intent node). Property nodes "date/time" and "location" can each be linked to the "weather search" node. It should be recognized that in some examples, one or more property nodes can be relevant to two or more actionable intents. In these examples, the one or more property nodes can be linked to the respective nodes corresponding to the two or more actionable intents in ontology 460.

An actionable intent node, along with its linked concept nodes, can be described as a "domain." In the present discussion, each domain can be associated with a respective actionable intent, and can refer to the group of nodes (and the relationships there between) associated with the particular actionable intent. For example, ontology 460 shown in FIG. 4C can include an example of media domain 462 and an example of weather domain 464 within ontology 460. Media domain 462 can include the actionable intent node "media search" and property nodes "actor(s)," "media genre," and "media title." Weather domain 464 can include the actionable intent node "weather search," and property nodes "location" and "date/time." In some examples, ontology 460 can be made up of many domains. Each domain can share one or more property nodes with one or more other domains.

While FIG. 4C illustrates two example domains within ontology 460, other domains can include, for example, "athletes," "stocks," "directions," "media settings," "sports team," and "time," "tell joke," and so on. An "athletes" domain can be associated with a "search athlete information" actionable intent node, and may further include property nodes such as "athlete name," "athlete team," and "athlete statistics."

In some examples, ontology 460 can include all the domains (and hence actionable intents) that the digital assistant is capable of understanding and acting upon. In some examples, ontology 460 can be modified, such as by adding or removing entire domains or nodes, or by modifying relationships between the nodes within the ontology 460.

In some examples, each node in ontology 460 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 444 in association with the property or actionable intent represented by the node. For example, returning to FIG. 4C, the vocabulary associated with the node for the property of "actor" can include words such as "A-list," "Reese Witherspoon," "Arnold Schwarzenegger," "Brad Pitt," and so on. For another example, the vocabulary associated with the node for the actionable intent of "weather search" can include words and phrases such as "weather," "what's it like in," "forecast," and so on. The vocabulary index 444 can optionally include words and phrases in different languages.

Natural language processing module 432 can receive the token sequence (e.g., a text string) from STT processing module 430, and determine what nodes are implicated by the words in the token sequence. In some examples, if a word or phrase in the token sequence is found to be associated with one or more nodes in ontology 460 (via vocabulary index 444), the word or phrase can "trigger" or "activate" those nodes. Based on the quantity and/or relative importance of the activated nodes, natural language processing module 432 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 448 can include user-specific information, such as user-specific vocabulary, user preferences, user address, user's default and secondary languages, user's contact list, and other short-term or long-term information for each user. In some examples, natural language processing module 432 can use the user-specific information to supplement the information contained in the user input to further define the user intent. For example, for a user request "How's the weather this week," natural language processing module 432 can access user data 448 to determine where the user is located, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 432 identifies an actionable intent (or domain) based on the user request, natural language processing module 432 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Find me other seasons of this TV series." In this case, natural language processing module 432 can correctly identify the actionable intent to be "media search" based on the user input. According to the ontology, a structured query for a "media" domain may include parameters such as {media actor}, {media genre}, {media title}, and the like. In some examples, based on the speech input and the text derived from the speech input using STT processing module 430, natural language processing module 432 can generate a partial structured query for the restaurant reservation domain, where the partial structured query includes the parameters {media genre="television series"}. However, in this example, the user's utterance contains insufficient information to complete the structured query associated with the domain. Therefore, other necessary parameters such as {media title} may not be specified in the structured query based on the information currently available. In some examples, natural language processing module 432 can populate some parameters of the structured query with received contextual information. For example, the TV series "Mad Men" can be currently playing on the media device. Based on this contextual information, natural language processing module 432 can populate the {media title} parameter in the structured query with "Mad Men."

In some examples, natural language processing module 432 can pass the generated structured query (including any completed parameters) to task flow processing module 436 ("task flow processor"). Task flow processing module 436 can be configured to receive the structured query from natural language processing module 432, complete the structured query, if necessary, and perform the actions required to "complete" the user's ultimate request. In some examples, the various procedures necessary to complete these tasks can be provided in task flow models 454. In some examples, task flow models 454 can include procedures for obtaining additional information from the user and task flows for performing actions associated with the actionable intent.

As described above, in order to complete a structured query, task flow processing module 436 may need to initiate additional dialogue with the user in order to obtain additional information, and/or disambiguate potentially ambiguous utterances. When such interactions are necessary, task flow processing module 436 can invoke dialogue flow processing module 434 to engage in a dialogue with the user. In some examples, dialogue flow processing module 434 can determine how (and/or when) to ask the user for the additional information and can receive and process the user responses. The questions can be provided to and answers can be received from the users through I/O processing module 428. In some examples, dialogue flow processing module 434 can present dialogue output to the user via audio and/or visual output, and can receive input from the user via spoken or physical (e.g., clicking) responses. For example, the user may ask "What's the weather like in Paris?" When task flow processing module 436 invokes dialogue flow processing module 434 to determine the "location" information for the structured query associated with the domain "weather search," dialogue flow processing module 434 can generate questions such as "Which Paris?" to pass to the user. Additionally, dialogue flow processing module 434 can cause affordances associated with "Paris, Texas" and "Paris, France" to be presented for user selection. Once a response is received from the user, dialogue flow processing module 434 can then populate the structured query with the missing information, or pass the information to task flow processing module 436 to complete the missing information from the structured query.

Once task flow processing module 436 has completed the structured query for an actionable intent, task flow processing module 436 can proceed to perform the ultimate task associated with the actionable intent. Accordingly, task flow processing module 436 can execute the steps and instructions in task flow model 454 according to the specific parameters contained in the structured query. For example, the task flow model for the actionable intent of "media search" can include steps and instructions for performing a media search query to obtain relevant media items. For example, using a structured query such as: {media search, media genre=TV series, media title=Mad Men}, task flow processing module 436 can perform the steps of: (1) performing a media search query using a media database to obtain relevant media items, (2) ranking the obtained media items according to relevancy and/or popularity, and (3) displaying the media items sorted according to relevancy and/or popularity.

In some examples, task flow processing module 436 can employ the assistance of service processing module 438 ("service processing module") to complete a task requested in the user input or to provide an informational answer requested in the user input. For example, service processing module 438 can act on behalf of task flow processing module 436 to perform a media search, retrieve weather information, invoke or interact with applications installed on other user devices, and invoke or interact with third-party services (e.g., a social networking website, media review websites, media subscription services, etc.). In some examples, the protocols and API required by each service can be specified by a respective service model among service models 456. Service processing module 438 can access the appropriate service model for a service and generate requests for the service in accordance with the protocols and APIs required by the service according to the service model.

For example, a third-party media search service can submit a service model specifying the necessary parameters for performing a media search and the APIs for communicating the values of the necessary parameters to the media search service. When requested by task flow processing module 436, service processing module 438 can establish a network connection with the media search service and send the necessary parameters of the media search (e.g., media actor, media genre, media title) to the online reservation interface in a format according to the API of the media search service.

In some examples, natural language processing module 432, dialogue flow processing module 434, and task flow processing module 436 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 440 (e.g., speech synthesizer) where it can be processed to synthesize the dialogue response in speech form. In yet other examples, the generated response can be data content relevant to satisfying a user request in the speech input.

Speech synthesis module 440 can be configured to synthesize speech outputs for presentation to the user. Speech synthesis module 440 synthesizes speech outputs based on text provided by the digital assistant. For example, the generated dialogue response can be in the form of a text string. Speech synthesis module 440 can convert the text string to an audible speech output. Speech synthesis module 440 can use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 440 can be configured to synthesize individual words based on phonemic strings corresponding to the words. For example, a phonemic string can be associated with a word in the generated dialogue response. The phonemic string can be stored in metadata associated with the word. Speech synthesis module 440 can be configured to directly process the phonemic string in the metadata to synthesize the word in speech form.

In some examples, instead of (or in addition to) using speech synthesis module 440, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Process for Operating a Digital Assistant in a Media Environment

FIGS. 5A-E illustrate process 500 for operating a digital assistant of a media system according to various examples. Process 500 can be performed using one or more electronic devices implementing a digital assistant. For example, process 500 can be performed using one or more of system 100, media system 128, media device 104, user device 122, or digital assistant system 400, described above. FIGS. 6A-K depict screen shots displayed by a media device on a display unit at various stages of process 500, according to various examples. Process 500 is described below with simultaneous reference to FIGS. 5A-E and 6A-K. It should be appreciated that some operations in process 500 can be combined, the order of some operations can be changed, and some operations can be omitted.

Figure 6A:
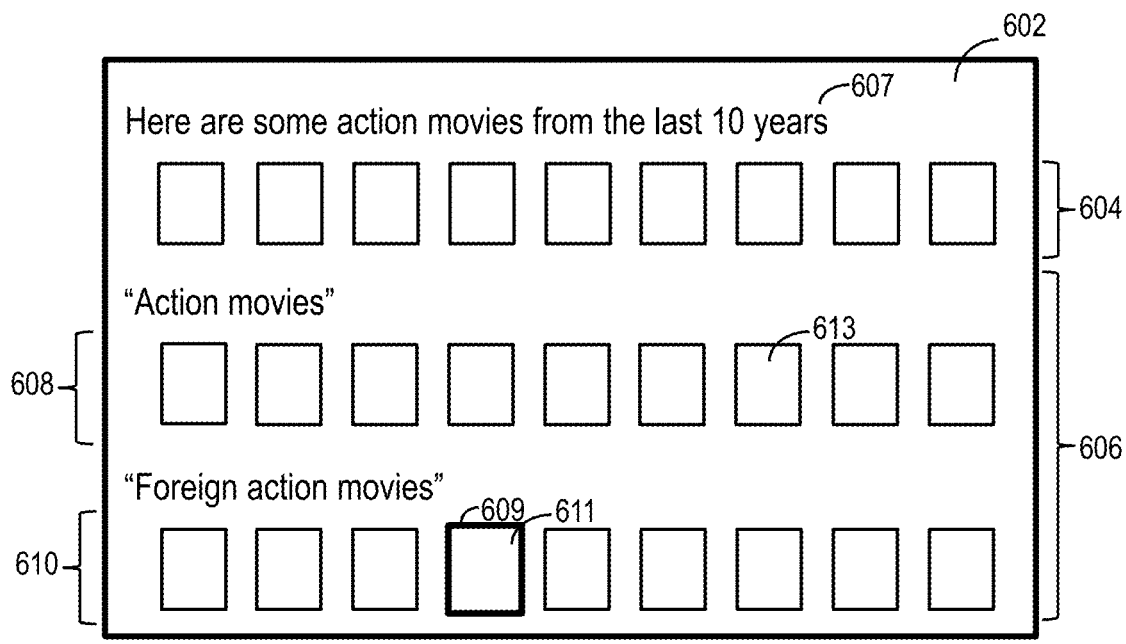
FIGS. 6A-K illustrate screen shots displayed by a media device on a display unit at various stages of the process shown in FIGS. 5A-E according to various examples.

At block 502 of process 500 and with reference to FIG. 6A, primary set of media items 604 can be displayed on a display unit. Each media item can correspond to specific media content (e.g., a movie, video, television show/series, video game, etc.). Primary set of media items 604 can be displayed in response to a previously received media search request. In some examples, the previously received media search request can be a spoken interaction with the digital assistant. In other examples, the previously received media search request can be text interaction with the digital assistant received via a keyboard interface of the media device.

Primary set of media items 604 can be obtained by performing a primary media search query in accordance with the previously received media search request. In some examples, the primary media search query can be a structured search based on one or more parameter values defined in the previously received media search request. In these examples, each media item of primary set of media items 604 can include one or more parameter values that match the one or more parameter values defined in the previously received media search request. In other examples, the primary media search query can be a string search based on a text input string of the previously received media search request. In these examples, each media item of primary set of media items 604 can be associated with text that matches the text input string of the previously received media search request.

Media items 604 can share common attributes or parameter values corresponding to the previously received media search request. In the present example shown in FIG. 6A, the previously received media search request can be a request for action movies from the last 10 year. Primary set of media items 604 can be obtained to satisfy the previously received media search request. In this example, primary set of media items 604 can include action movies such as "THE AMAZING SPIDER MAN 2," "FURIOUS 7," and "IRON MAN 3," which were released in the last 10 years. Text 607 describing the attributes or parameter values corresponding to the previously received media search request can be displayed in association with primary set of media items 604.

As shown in FIG. 6A, primary set of media items 604 can be displayed via user interface 602. User interface 602 can be configured to enable the user to navigate through the media items in user interface 602 and select a particular media item for consumption. In some examples, one or more secondary sets of media items 606 can be displayed with primary set of media items 604 in user interface 602. It should be recognized that secondary sets of media items may not always be displayed. In some examples, user interface 602 can occupy at least a majority of a display area of the display unit. In other examples, the display unit can display media content (not shown) playing on the media device while displaying user interface 602. In these examples, the display area occupied by user interface 602 on the display unit can be smaller than the display area occupied by the media content on the display unit. Further, in these examples, user interface 602 may not include secondary sets of media items 606. In particular, the only media items displayed via user interface 602 can be primary set of media items 604.

Each displayed media item of primary set of media items 604 and secondary set of media items 606 can be associated with parameter values of parameters such as media type, media title, actors, media characters, director, media release date, media duration, media quality rating, media popularity rating, and the like. In some examples, one or more parameter values of each media item may be displayed, via user interface 602, as text on or adjacent to the respective media item.

In the present example, the one or more secondary sets of media items 606 can be based on the primary set of media items 604. In particular, the one or more secondary sets of media items 606 can share a common attribute or parameter value with the primary set of media items 604. As shown in FIG. 6A, secondary set of media items 608 can be action movies and secondary set of media items 610 can be foreign action movies. Thus, in this example, the primary and secondary sets of media items 604 and 606 can all relate to the media genre of action movies. It should be recognized that in other examples, secondary sets of media items 606 can be based on parameter values derived from other information, such as previous media search requests or popular trending media items and categories.

At block 504 of process 500, a user input can be detected. The user input can be detected while primary set of media items 604 are displayed at block 502. In some examples, the user input can be detected on a remote control (e.g., remote control 124) of the media device. In particular, the user input can be a user interaction with the remote control, such as the pressing of a button (e.g., button 274) or the contacting of a touch-sensitive surface (e.g., touch-sensitive surface 278) of the remote control. In some examples, the user input can be detected via a second electronic device (e.g., device 122) that is configured to interact with the media device. The user input can be associated with invoking the digital assistant of the media device. In response to detecting the user input, one or more of blocks 506-510 can be performed.

At block 506 of process 500, an audio input can be received. The audio input can contain a media-related request. For example, in response to detecting the user input at block 504, audio input can be sampled via a microphone (e.g., microphone 272) of the media device. The sampled audio input can include a media-related request in the form of a user utterance. In some examples, the audio input containing the media-related request can be received while at least a portion of primary set of media items 604 is displayed. The media-related request can be in natural language form. In some examples, the media-related request can be underspecified, where not all of the information needed to satisfy the request is explicitly defined. For example, the media-related request can be: "Jack Ryan." In this example, the request does not explicitly specify whether it is a new media search request for movies with the character Jack Ryan or a request to filter the currently displayed media items based on the character Jack Ryan.

In some examples, the media-related request can include one or more ambiguous terms. For example, the media-related request can be: "Which are the good ones?" In this example, the media-related request includes the ambiguous term "ones" that is intended to refer to the media items (e.g., primary and/or secondary sets of media items 604, 606) being displayed. Further, in this example, the media-related request defines a parameter value (e.g., user rating or critic rating) of the media items using an ambiguous term (e.g., "good").

The media-related request can define one or more parameter values associated with media items. Examples of parameter values that can be defined in the media-related request include media type, media title, actors, media characters, media director, media release date, media duration, media quality rating, media popularity rating, and the like.

In some examples, the media-related request can be a media search request. In some examples, the media-related request can be a request to correct the primary media search query. In other examples, the media-related request can be a request to navigate through media items displayed on user interface 602. In yet other examples, the media-related request can be a request to adjust the state or setting of an application of the media device.

Although in the present example, the media-related request is received in an audio input, it should be appreciated that in other examples, the media-related request can be received as text input. In particular, in place of audio input, text input containing the media-related request can be received at block 506 via a key board interface. It should be recognized that block 508 need not be performed in examples where the media-related request is received as text input. Rather, the primary user intent can be determined directly from the text input at block 510.

At block 508 of process 500, a text representation of the media-related request can be determined. For example, the text representation can be determined by performing speech-to-text (STT) processing on the audio input received at block 506. In particular, the audio input can be processed using a STT processing module (e.g., STT processing module 430) to convert the media-related request in the audio input into the text representation. The text representation can be a token string representing a corresponding text string. In some examples, the text representation can be displayed on the display unit. In particular, the text representation can be displayed in real-time while the audio input is being received at block 506.

One or more language models can be used during STT processing to determine the text representation. In some examples, the STT processing can be biased toward media-related text results. Specifically, the one or more language models used to determine the text representation can be biased towards media-related text results. For example, the one or more language models can be trained using a corpus of media-related text. Additionally or alternatively, the biasing can be implemented by more heavily weighting candidate text results that are related to media. In this way, candidate text results that are related to media can be ranked higher with the biasing than without the biasing. The biasing can be desirable for increasing the accuracy of STT processing for media-related words or phrases in the media-related request (e.g., movie names, movie actors, etc.). For example, certain media-related words or phrases, such as "JURASSIC PARK," "Arnold Schwarzenegger," and "SHREK," can be infrequently found in typical corpuses of text and thus may not be recognized successfully during STT processing without biasing toward media-related text results.

As described above, text associated with the media items (e.g., primary set of media items 604 and secondary sets of media items 606) displayed at block 502 may be displayed via user interface 602. The text may describe one or more attributes or parameter values of each media item in user interface 602. For example, primary set of media items 604 may include a media item corresponding to the movie "IRON MAN 3." In this example, the displayed text could include the title "IRON MAN 3," the actors "Robert Downey Jr" and "Gwyneth Paltrow," and the director "Shane Black." In some examples, a custom language model can be generated using the displayed text associated with the displayed media items. STT processing can then be performed using the custom language model to determine the text representation. In particular, candidate text results from the custom language model can be afforded greater weight relative to candidate text results from other language models when determining the text representation. It should be recognized that in some examples, not all attributes or parameter values associated with primary set of media items 604 and secondary sets of media items 606 may be displayed as text on the display unit. In these examples, text of the attributes or parameter values of primary set of media items 604 and secondary sets of media items 606 not displayed on the display unit can also be used to generate the custom language model.

In some examples, a predicted text can be determined using the text representation. For example, a language model can be used to predict one or more subsequent words based on the sequence of words in the text representation. The predicted text can be determined while audio input is being received. Further, the predicted text can be displayed with the text representation on the display unit. In particular, the predicted text can be displayed in real-time while audio input is being received at block 506.

The predicted text can be accepted by the user based on detecting an end-point of the audio input. In some examples, the end-point can be detected once the user input of block 504 is no longer detected. In other examples, the end-point can be detected at a predetermined duration after one or more audio characteristics of the audio input no longer satisfy predetermined criteria. A determination can be made as to whether an end-point of the audio input is detected after displaying the predicted text. In accordance with a determination that an end-point of the audio input is detected after displaying the predicted text, the predicted text can be determined to be accepted by the user. In particular, the text representation and the accepted predicted text can be used to determine the primary user intent at block 510.

In some examples, the one or more language models used to determine the text representation can be configured to recognize media-related terms in multiple languages. In particular, media-related terms (e.g., media titles, actor names, etc.) may have unique translations across different languages. For examples, the actor "Arnold Schwarzenegger" corresponds to "阿诺德 施瓦辛格" in Chinese and "☐ ☐ ☐ ☐ ☐ ☐ ☐ ☐ ☐ ☐ ☐ ☐ ☐ ☐ ☐ ☐ ☐" in Hindi. The one or more language models used to determine the text representation can be trained using corpuses of media-related text in various languages. Thus, the one or more language models can be configured to recognize the corresponding translations of media-related terms in the various languages.

At block 510 of process 500, a primary user intent corresponding to the media-related request can be determined. The primary user intent can be determined by performing natural language processing on the text representation. In particular, the text representation can be parsed and processed using a natural language processing module (e.g., natural language processing module 432) to determine multiple candidate user intents corresponding to the media-related request. The candidate user intents can be ranked according to probability and the candidate user intent having the highest probability can be determined to be the primary user intent.

Determining the primary user intent can include determining the relevant domain or actionable intent associated with the text representation. In some examples, a media type associated with the media-related request can be determined at block 510 and the relevant domain or actionable intent can be determined based on the determined media-type associated with the media-related request. For example, based on the media-related request "James Bond," the media type can be determined to be "movies/television shows" and the corresponding actionable intent or domain can be determined to be "Find movies/television shows." In this example, the media-related request can be fulfilled by performing a media search for "James Bond" in accordance with the media type "movies/television shows." Specifically, a movies and television shows database can be searched for the media character "James Bond" to fulfill the media-related request. In another example, based on the media-related request "Taylor Swift," the media type can be determined to be "music" and the corresponding actionable intent or domain can be determined to be "Find music." In this example, the media-related request can be fulfilled by searching a music database (e.g., performing a search on the ITUNES music service) for the singer "Taylor Swift."

In some examples, natural language processing for determining the primary user intent can be biased toward media-related user intents. In particular, the natural language processing module can be trained to identify media-related words and phrases (e.g., media titles, media genres, actors, MPAA film-rating labels, etc.) that trigger media-related nodes in the ontology. For example, the natural language processing module can identify the phrase "JURASSIC PARK" in the text representation as a movie title and as a result, trigger a "media search" node in the ontology associated with the actionable intent of searching for media items. In some examples, the biasing can be implemented by restricting the nodes in the ontology to a predetermined set of media-related nodes. For example, the set of media-related nodes can be nodes that are associated with the applications of the media device. Further, in some examples, the biasing can be implemented by weighting candidate user intents that are media-related more heavily than candidate user intents that are not media-related.

In some examples, the primary user intent can be obtained from a separate device (e.g., DA server 106). In particular, the audio data can be transmitted to the separate device to perform natural language processing. In these examples, the media device can indicate to the separate device (e.g., via data transmitted to the separate device with the sampled audio data) that the sampled audio data is associated with a media application. The indicating can bias the natural language processing toward media-related user intents.

The natural language processing module can be further trained to identify the semantics of media-related terms in various languages and regions. For example, the natural language processing module can recognize that "Arnold Schwarzenegger," "阿诺 德 施瓦辛格," and "󠄀󠄀󠄀󠄀󠄀󠄀󠄀 󠄀󠄀 󠄀󠄀󠄀󠄀󠄀󠄀󠄀󠄀" all refer to the same actor.

Additionally, movie titles may vary across different languages and regions. For example, the movie "Live Free or Die Hard" in the United States is titled as "Die Hard 4.0" in the United Kingdom. In another example, the movie "Top Gun" in the United States is titled as "Love in the Skies" in Isreal. Thus, the natural language processing module may be configured to identify that "Top Gun" in English and "Love in the Skies" in Hebrew both refer to the same movie.

In some examples, the natural language processing module can be configured to identify intended parameter values based on ambiguous terms in the media-related request. In particular, the natural language processing module can determine the strength of connection (e.g., relevance, salience, semantic similarity, etc.) between the ambiguous term and one or more parameter values. The parameter value having the strongest connection to the ambiguous term can be determined to be the intended parameter value. For example, the media-related request can be: "Show me the good ones." The term "good" can be ambiguous as it does not explicitly define a particular parameter value. In this example, based on the strength of connection to the term "good," the natural language processing module can determine that "good" refers to the parameter value of average user rating greater than a predetermined value.

In some examples, a preliminary user intent can be determined prior to determining the primary user intent. The preliminary user intent can include determining the actionable intent or domain using a portion of the audio input (but not the entire audio input) received at block 506. The process for determining the preliminary user intent can be less robust and thus quicker than determining the primary user intent. This can enable the preliminary user intent to be determined while the audio input is still being received. Determining the preliminary user intent can enable data that is required to fulfill the media-related request to be pre-fetched, thereby reducing the response time of the digital assistant. For example, the media-related request can be: "What's on at 7 PM?" Based on the first portion of this request, "What's on . . . ," the preliminary user intent can be determined to be "search channel programming." Based on this preliminary user intent, data required to fulfill this preliminary user intent can be identified. In particular, it can be determined that the subscription information of the user would be needed to determine the channels available to the user. The programming corresponding to those channels can then be determined. The digital assistant can initially determine whether the required data is already stored on the media system or the digital assistant server. In accordance with a determination that the data is stored on the media system or the digital assistant server at the time the preliminary user intent is determined, the data can be retrieved while the primary user intent is being determined. In accordance with a determination that the data is not stored on the media system or digital assistant at the time the preliminary user intent is determined, the required data can be obtained while the primary user intent is being determined. For example, the digital assistant can automatically, without user intervention, communicate with the subscription service provider of the user and retrieve the channels that are available to the user.

Figure 5A:
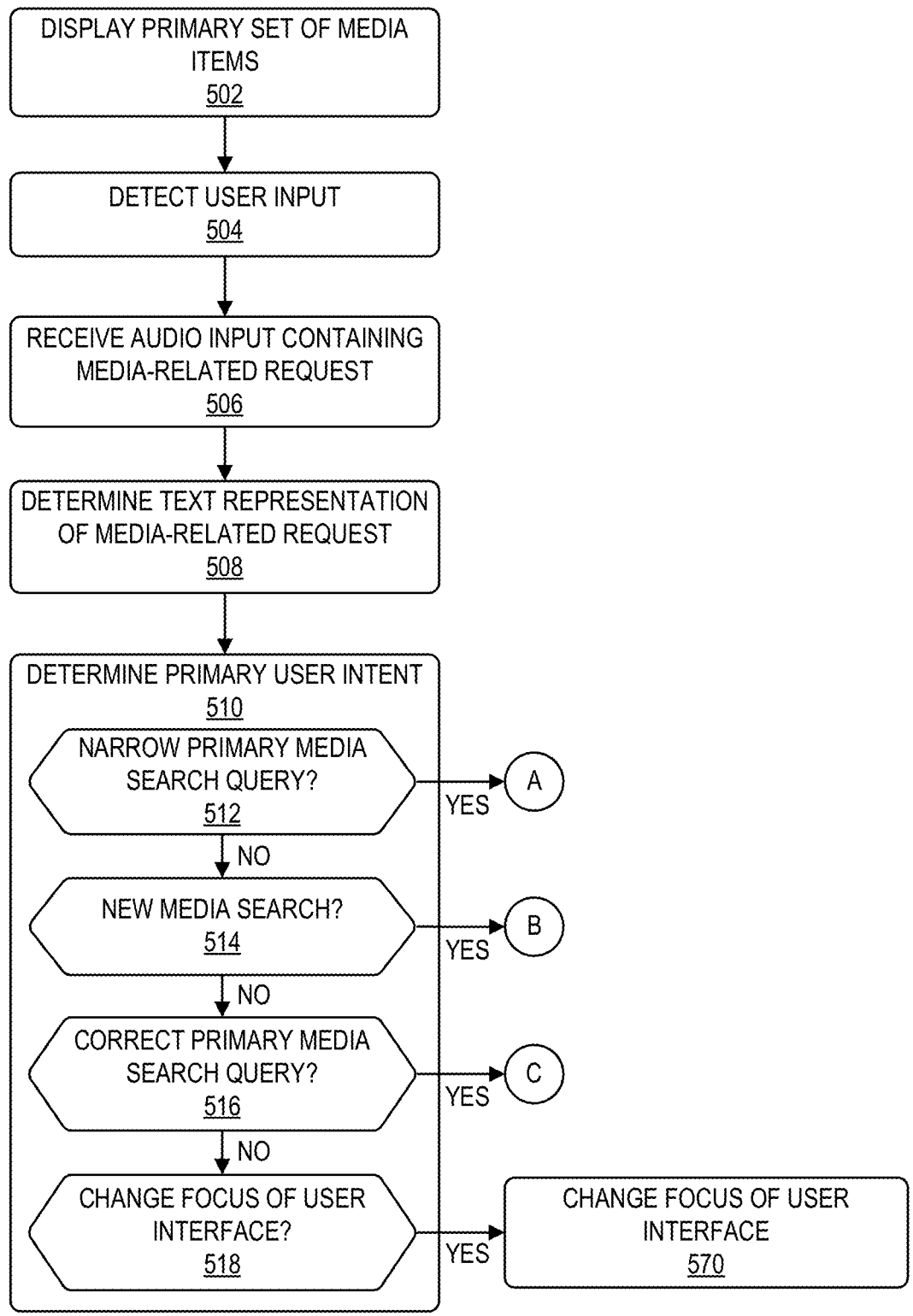
FIGS. 5A-E illustrate a process for operating a digital assistant of a media system according to various examples.

As shown in FIG. 5A, block 510 of process 500 can include one or more of blocks 512-518. At block 512 of process 500, a determination can be made as to whether the primary user intent comprises a user intent to narrow a primary media search query corresponding to primary set of media items 604. In other words, it can be determined at block 510 whether the media-related request of block 506 is a request to narrow the previously received media search request. In some examples, determining whether the primary user intent comprises a user intent to narrow the primary media search query can include determining whether the media-related request includes a predetermined word or phrase corresponding to a user intent to narrow the primary media search query. The predetermined word or phrase can include one of a plurality of refinement terms. For example, the predetermined word or phrase can indicate an explicit request to narrow the previous media search request received prior to the media search request. Further, in some examples, the determination can be made based on the position of the predetermined word or phrase in the media-related request (e.g., at the beginning, middle, or end of the media-related request).

Figure 6B:
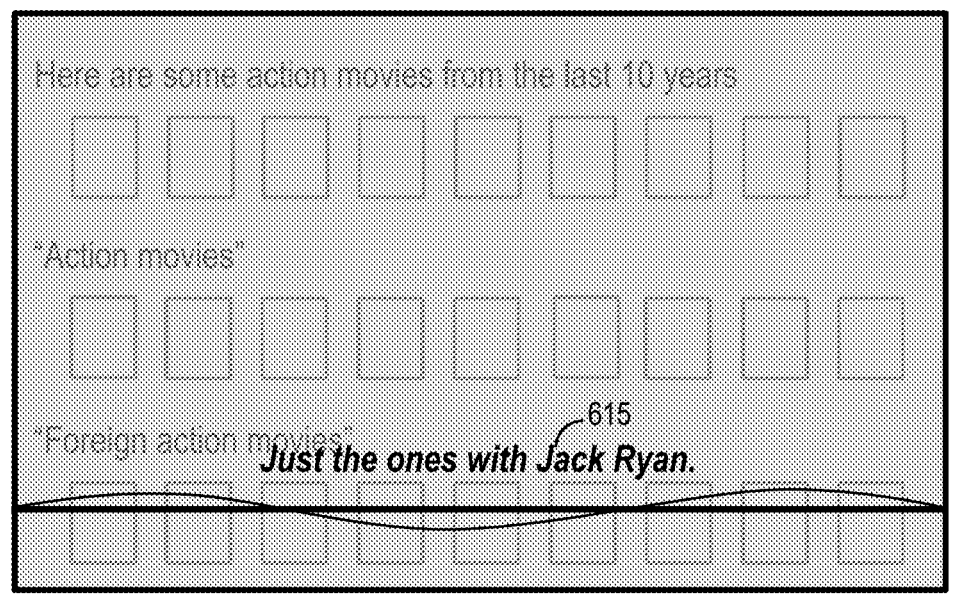
Figure 6C:
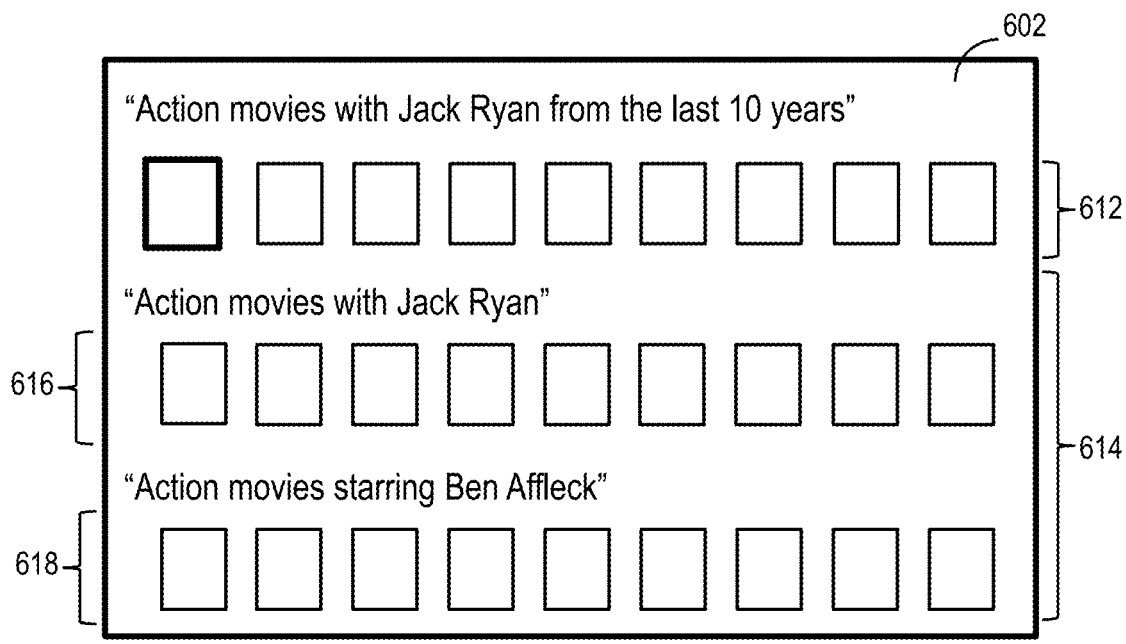

In the example shown in FIGS. 6B-C, the media-related request may be: "Just the ones with Jack Ryan." Text representation 615 corresponding to this media-related request can be parsed during natural language processing to determine whether the media-related request includes a predetermined word or phrase corresponding to a user intent to narrow the primary media search query. Examples of predetermined words or phrases that correspond to a user intent to narrow the primary media search query can include "just," "only," "filter by," "which ones," and the like. In this example, based on the predetermined word "just" positioned at the beginning of the media-related request, it can be determined that the primary user intent comprises a user intent to narrow the primary media search query corresponding to primary set of media items 604. Specifically, it can be determined that the primary user intent is to narrow the search for action movies released in the last 10 years to include only media items with the character Jack Ryan. It should be recognized that other techniques can be implemented to determine whether the primary user intent comprises a user intent to narrow a primary media search query corresponding to primary set of media items 604. Further, it should be recognized that the primary user intent can be based on one or more previous user intents corresponding to one or more previous media search requests received prior to the media search request of block 506.

In accordance with the determination that the primary user intent comprises a user intent to narrow a primary media search query corresponding to primary set of media items 604, one or more of blocks 520-534 can be performed.

At block 520 of process 500, second primary set of media items 614 can be obtained to satisfy the primary user intent. Block 520 can include generating a second primary media search query corresponding to the primary user intent. The second primary media search query can be based on the media-related request (e.g., "Just the ones with Jack Ryan") and the primary media search query (e.g., "Action movies from the last 10 years"). Specifically, the second primary media search query can include a set of parameter values. The set of parameter values can include one or more parameter values defined in the media-related request and one or more parameter values of the primary media search query. For example, the second primary media search query can be a query to search for media items having the media type of "movies," the media genre of "action," the release date of "last 10 years," and the media character of "Jack Ryan." Alternatively, the second primary media search query can be a query to filter primary set of media items 604 and identify only the media items within set of media items 604 having the media character of "Jack Ryan." The second primary media search query can be generated by the natural language processing module (e.g., natural language processing module 432) based on the primary user intent.

Block 520 can further include performing the second primary media search query to obtain second primary set of media items 614. The second primary media search query can be performed by searching one or more media databases for media items that satisfy the parameter value requirements of the second primary media search query. Each media item of the second primary set of media items can be associated with a set of parameter values. The set of parameter values can include one or more parameter values in the primary media search query and one or more parameter values defined in the media-related request of block 506. Further, each media item of the second primary set of media items 614 can be associated with a relevancy score. The relevancy score can indicate the likelihood that the media item satisfies the primary user intent. For example, a higher relevancy score can indicate a higher likelihood that the media item satisfies the primary user intent. The second primary media search query can be performed by the task flow processing module (e.g., task flow processing module 436).

In examples where primary set of media items 604 are obtained by performing a string search based on the previously received media search request (e.g, received via a keyboard interface), the second primary media search query can be performed by searching primary set of media items 604 for media items that satisfy the parameter value requirements defined in the media-related request (e.g., "Jack Ryan"). In particular, the parameter values associated with primary set of media items 604 can be first obtained. The second primary set of media items 614 can then be obtained by performing a structured search using the obtained parameter values and based on the parameter values defined in the media-related request.

At block 522 of process 500, second primary set of media items 614 can be displayed on the display unit via user interface 602. In particular, as shown in FIG. 6C, display of primary set of media items 604 on the display unit can be replaced with display of second primary set of media items 614. Second primary set of media items 614 can be displayed according to the relevancy score associated with each media item. For example, with reference to FIG. 6C, second primary set of media items 614 can be arranged in decreasing order of relevancy score from left to right on user interface 602.

Figure 5B:
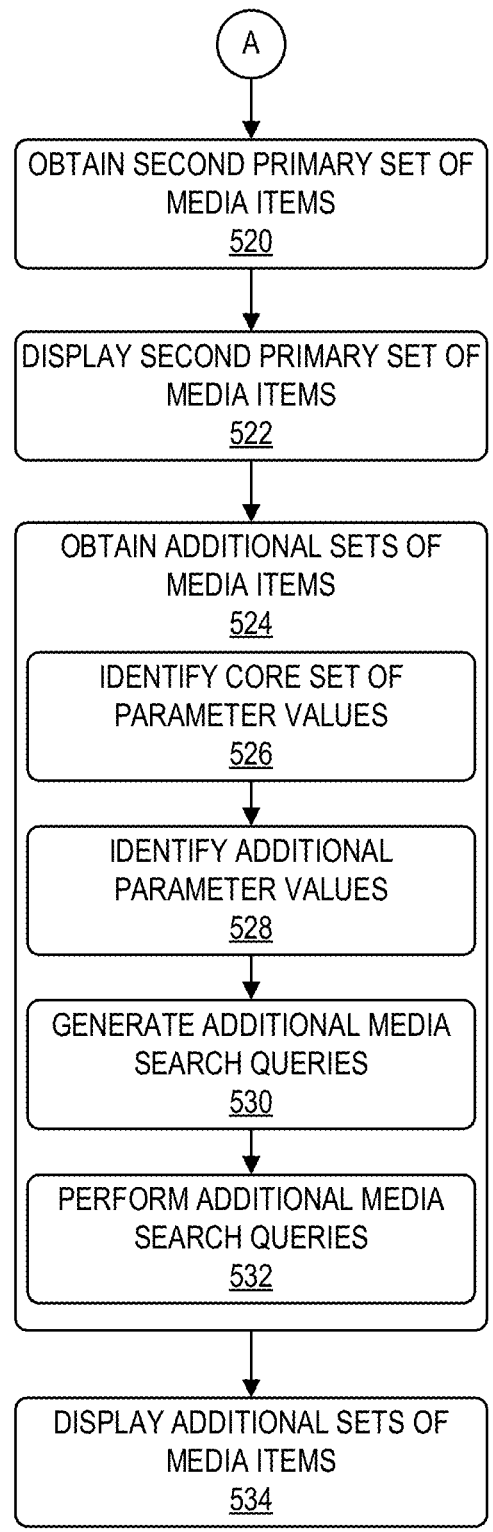
Figure 5C:
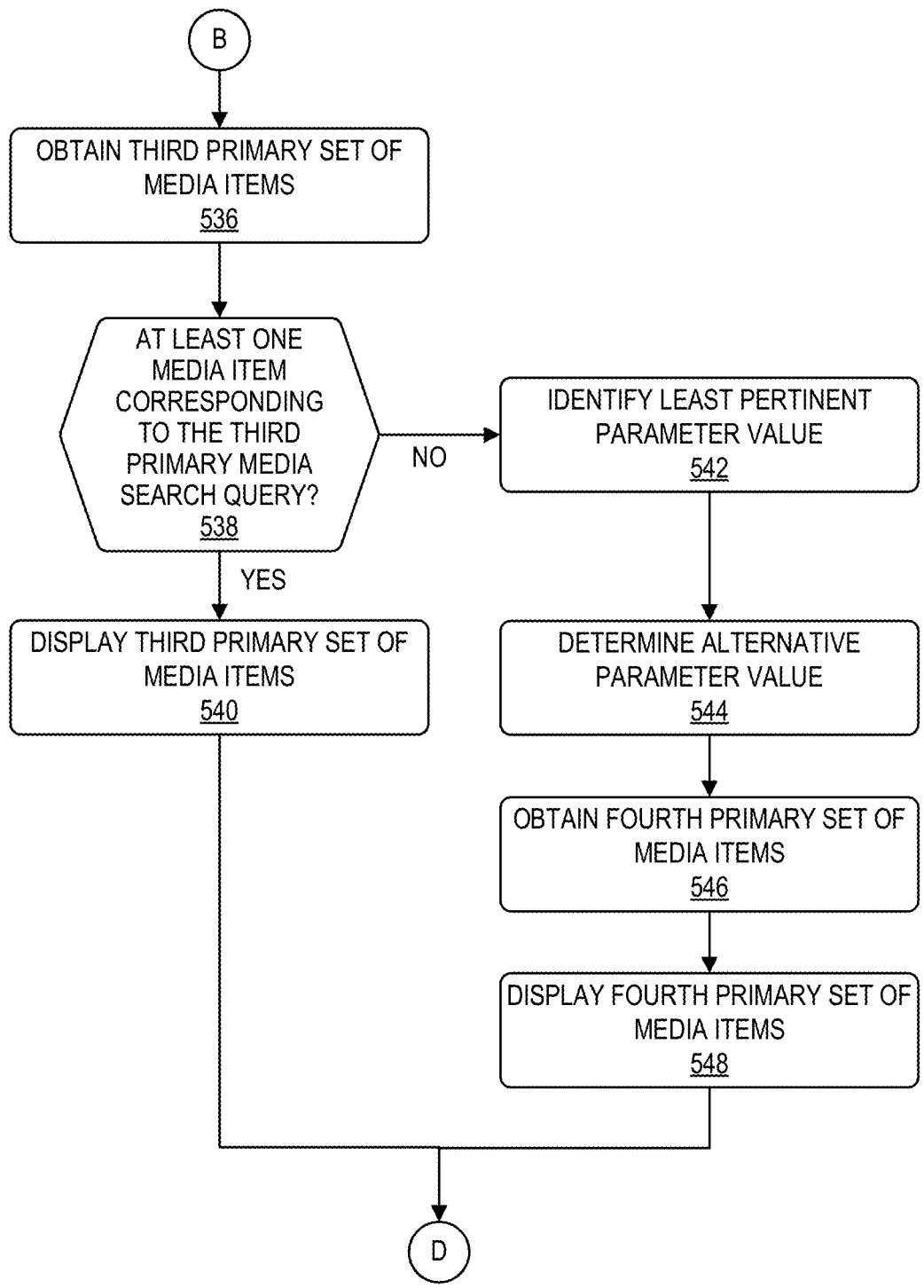

At block 524 of process 500, additional sets of media items can be obtained. The additional sets of media items can be obtained to offer the user alternative options that may be pertinent to the primary user intent. As shown in FIG. 5B, block 524 can include blocks 526-532.

At block 526 of process 500, a core set of parameter values associated with second primary set of media items 612 can be identified. The core set of parameter values can be identified from the set of parameter values in the second primary media search query. In particular, non-salient parameter values in the set of parameter values can be identified and disregarded. The remaining parameter values in the set of parameter values after disregarding non-salient parameter values can be identified as the core set of parameter values. Non-salient parameter values can be predetermined parameter values such as, for example, media release date ranges, media type, media provider, media quality rating, free or paid media, live or on-demand media, and the like. The core set of parameter values can have fewer parameter values than the set of parameter values.

In the example of FIG. 6C, the set of parameter values in the second primary media search query includes the parameter values "action movie," "last 10 years," and "Jack Ryan." In this example, the parameter value "last 10 years" can be identified as a non-salient parameter value (e.g., media release data range) and removed. Thus, the remaining parameter values "action movie" and "Jack Ryan" can be identified as the core set of parameter values.

At block 528 of process 500, one or more additional parameter values can be identified. The one or more additional parameter values can be identified based on information that is likely to reflect the media consumption interests of the user. For example, the one or more additional parameter values can be identified based on the user's media selection history, the user's media search history, or the media items in the user's watch list. Additionally or alternatively, the one or more additional parameter values can be identified based on the media selection history of a plurality of users, which can indicate the parameter values of media items that are currently most popular among users of media devices. In some examples, methods of identifying one or more additional parameter values can be similar to methods of determining other relevant parameter values described at block 560.

Returning to the example of FIG. 6C, it can be determined that action movies starring Ben Affleck are popular among users of media devices. Further, it can be determined that the user recently searched for or selected movies starring Ben Affleck. Thus, in this example, "Ben Affleck" can be identified as a parameter value of the one or more additional parameter values.

At block 530 of process 500, one or more additional media search queries can be generated. The additional media search queries can be based on the core set of parameter values identified at block 526. Further, the additional media search queries can be based on the one or more additional parameter values identified at block 528. For example, in FIG. 6C, the one or more additional media search queries can include a search for action movies with Jack Ryan (core set of parameter values) and a search for action movies starring Ben Affleck (additional parameter value identified at block 528).

Blocks 526-530 can be performed by the natural language processing module (e.g., natural language processing module 432). In particular, the natural language processing module can identify the core set of parameter values (at block 526) and one or more additional media search queries (at block 528) to determine one or more additional user intents. The natural language processing module can then generate one or more additional media search queries (e.g., structured queries described above with reference to FIG. 4B) based on the one or more additional user intents.

At block 532 of process 500, the one or more additional media search queries of block 530 can be performed. For example, the one or more additional media search queries can be performed by searching one or more media databases for media items that satisfy the additional media search queries. The media databases used can be based on the media type being searched. For example, a music database can be used for media search queries involving music and a movie/television show database can be used for media search queries involving music/television shows. One or more additional sets of media items 614 can thus be obtained from performing the one or more additional media search queries of block 530. Specifically, in FIG. 6C, additional set of media items 616 (e.g., the movies "Patriot Games," "Clear and Present Danger," etc.) can be obtained from searching for action movies with Jack Ryan and additional set of media items 618 (e.g., the movies "The Sum of All Fears," "Daredevil," etc.) can be obtained from searching for action movies starring Ben Affleck. Blocks 532 can be performed by the task flow processing module (e.g., task flow processing module 436).

It should be recognized that certain aspects of block 524, described above, can similarly apply to blocks 546 or 562.

At block 534 of process 500, the one or more additional sets of media items can be displayed on the display unit. For example, as shown in FIG. 6C, additional sets of media items 616 and 618 can be displayed via user interface 602. Additional sets of media items 616 and 618 can serve to provide the user with additional options that are likely to interest the user. This can be desirable to increase the likelihood that the user will find and select a media item for consumption without having to request another search, which can reduce browsing time and improve user experience.

The manner in which the sets of media items are displayed can reflect the likelihood that the respective user intent corresponds to the user's actual intent. For example, as shown in FIG. 6C, the second primary set of media items is associated with the primary user intent (the user intent that is most likely to reflect the actual user intent) and is displayed in a top row of user interface 602. The one or more additional sets of media items 616 and 618 are associated with additional user intents (user intents that are less likely to reflect the actual user intent) and are displayed in one or more subsequent rows of user interface 602 below the top row. Further, the additional user intent associated with additional set of media items 616 can be more likely to reflect the actual user intent than the additional user intent associated with additional set of media items 618. Thus, in this example, additional set of media items 618 can be displayed in the row below additional set of media items 616. Although in the present example, the sets of media items are displayed in rows, it should be recognized that in other examples, other display configurations can be implemented.

With reference back to block 512, in accordance with a determination that the primary user intent does not comprise a user intent to narrow the primary media search query, one or more of blocks 514-518, or 536-548 can be performed.

At block 514 of process 500, a determination can be made as to whether the primary user intent comprises a user intent to perform a new media search query. In some examples, the determination can be made based on explicit words or phrases in the media-related request. Specifically, it can be determined whether the media-related request includes a word or phrase corresponding to a user intent to perform a new media search query. The word or phrase can be predetermined words such as, "Show me," "Find," "Search for," "Other movies with," or the like. Further, in some examples, the determination can be made based on the position of the word or phrase in the media-related request (e.g., the beginning, middle, or end of the media-related request). In a specific example, the media-related request can be: "Show me some Jack Ryan movies." Based on the words "Show me" at the beginning of this media-related request, it can be determined that the primary user intent is to perform a new media search query for movies with Jack Ryan.

Figure 6D:
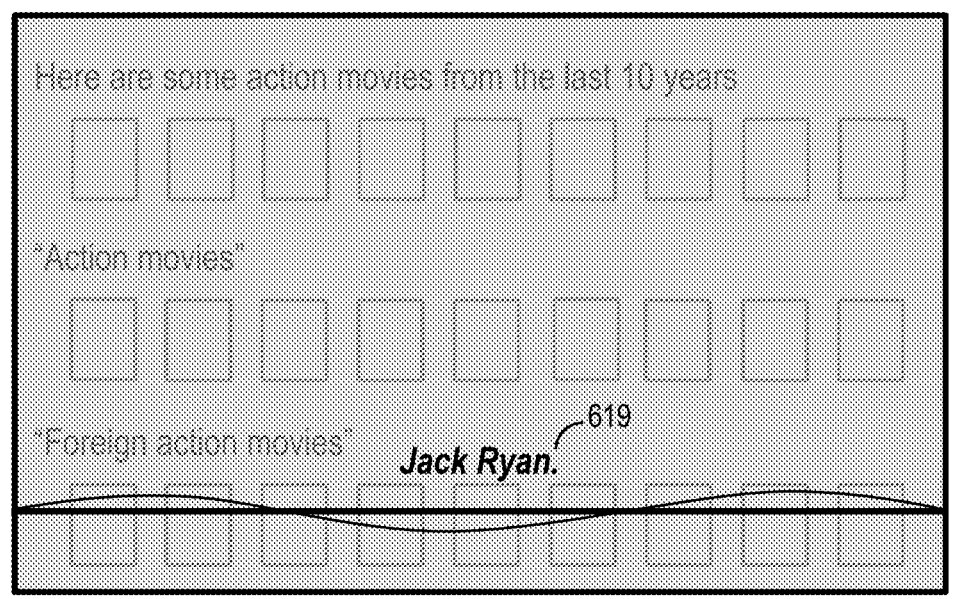

In the absence of an explicit word or phrase indicating the user intent (e.g., "Show me," "Find," "Search for," etc.), the determination at block 514 can be based on a word or phrase corresponding to a parameter value of one or more media items. For example, as shown in FIG. 6D, the media-related request can be: "Jack Ryan" (represented by text 619). In this example, the media-related request does not include any explicit indication of whether the user intent is to narrow the primary media search query or to perform a new search. The digital assistant, however, may recognize that "Jack Ryan" corresponds to a parameter value of one or more media item. Specifically, it can be determined that "Jack Ryan" is a media character associated with several electronic books and movies. Based on these parameter values, the primary user intent can be determined to be performing a new media search query for electronic books and movies with the character Jack Ryan. Other examples of words or phrases corresponding to a parameter value of one or more media items can include "Tom Cruise," "JURASSIC PARK," "Spy movies," "Sean Connery," "Cartoons," "FROZEN," and the like.

In accordance with a determination that the primary user intent comprises a user intent to perform a new media search query, one or more of blocks 536-548 can be performed. At block 536 of process 500, a third primary set of media items can be obtained in accordance with the primary user intent. Block 536 can be similar to block 520. In particular, block 536 can include generating a third primary media search query based on the media-related request. The third primary media search query can correspond to the primary user intent of performing a new media search query. Specifically, the second primary media search query can include one or more parameter values defined in the media-related request. For example, with reference to FIG. 6D, the third primary media search query generated can be a query to search for media items with the media character "Jack Ryan."

Block 536 can further include performing the third primary media search query to obtain third primary set of media items 620. The third primary media search query can be performed by searching one or more media databases for media items that satisfy the parameter value requirements of the third primary media search query. Each media item of third primary set of media items 620 can include one or more parameter values defined in the media-related request. Specifically, in the present example, each media item of third primary set of media items 620 can include "Jack Ryan" as a media character.

In some examples, the third primary media search query can be performed in accordance with the media type associated with the media-related request. As described above, the media type associated with the media-related request can be determined at block 510 while determining the primary user intent. The application or database used to perform the third primary media search query can be specific to the determined media type. In one example, if the media type is determined to be music, the third primary media search query can be performed using a music search application and/or a music database (e.g., ITUNES STORE application), and not, for example, a movies database.

In some examples, the media-related request can be associated with more than one media type. For example, the media-related request "FROZEN" can be associated with several media types, such as movies/television shows, music (e.g., the soundtrack), and electronic books. When performing the third primary media search query, a plurality of media items associated with various media types can be obtained from one or more media databases. Each media item can be associated with a relevancy score. The relevancy score can indicate how relevant the respective media item is with respect to the third primary media search query. Further, the relevancy score can be specific to the media database from which the candidate media item was obtained. In some examples, in order for media items from different databases to be compared based on the same standard, a normalized ranking of the plurality of candidate media items can be performed. In particular, the relevancy score can be normalized across the one or more media databases and the normalized relevancy score can be used to perform a normalized ranking of the candidate media items. For example, a universal media search application or database (e.g., spotlight of APPLE OS X or IOS) can be used to perform the third primary media search query. The universal media search application or database can be a service external to the digital assistant. Using the universal media search application or database, relevant media items can be obtained from various sources or databases (e.g., ITUNES STORE, APP STORE, IBOOKS, media items stored on the user's device, etc.) and the relevant media items can be ranked based on a normalized relevancy score. The media items can then be ordered and displayed according to the normalized ranking at block 540 for user selection.

The one or more databases used to obtain the third primary set of media items can include information derived from various sources. In some examples, the one or more databases can include information from one or more media critic reviews. The media critic reviews can be authored by, for example, professional media critics, journalists, bloggers, users of social media services or the like. In an illustrative example, the one or more media critic reviews can include a phrase such as "car chases" to describe movies such as "Bullitt," "The Bourne Identity," or "Fast Five." The phrase "car chases" can be extracted from the one or more media critic reviews as a parameter value, and this parameter value can be associated with one or more of these movies in a media database. Thus, for the media-related request "Show me movies with good car chases," the corresponding third primary media search query generated can be a search for movies with the parameter value "car chases." In searching one or more databases, candidate media items such as "Bullitt," "The Bourne Identity," or "Fast Five" can thus be obtained.

In other examples, the one or more databases can include information derived from the closed captioning of various movies, videos, or television shows. In particular, one or more parameter values can be extracted based on the closed captioning. For example, the closed captioning of movies such as "Bullitt," "The Bourne Identity," or "Fast Five," may include several instances of the caption "[Tire screeching]" to indicate the sound associated with a car chase. Based on this caption, one or more of these movies may be associated with the parameter value "car chase" in a media database. A candidate media item associated with this parameter value (e.g., "Bullitt," "The Bourne Identity," "Fast Five," or the like) can thus be identified when performing the third primary media search query.

In some examples, the media-related request can be a media search request based on a media item on which user interface 602 is focused. For example, cursor 609 of user interface 602 can be positioned on media item 611 while the media-related request is received at block 506. A determination can be made as to whether the media-related request is a request to obtain an alternative set of media items similar to media item 611. In one example, the media-related request can be: "More like this." In this example, it can be determined based on the context of the position of cursor 609 that "this" refers to media item 611. Thus, it can be determined that the media-related request is a request to obtain an alternative set of media items similar to media item 611. In response to determining that the media-related request is a request to obtain an alternative set of media items similar to media item 611, the third primary set of media items can be obtained at block 536, where each media item of the third primary set of media items includes one or more parameter values of media item 611. For instance, in one example, media item 611 can be the foreign action movie "Crouching Tiger, Hidden Dragon." In this example, the obtained third primary set of media items can include media items that share one or more parameter values of this movie. In particular, the obtained third primary set of media items can, for example, include movies that are directed by Ang Lee, include martial arts scenes, or star Chow Yun-Fat, Michelle Yeoh, or Zhang Ziyi.

It should be recognized that certain aspects of block 536 can similarly apply to blocks 520, 524, 546, 562, or 566.

At block 538 of process 500, a determination can be made as to whether at least one media item corresponding to the third primary media search query can be obtained. Upon performing the third primary media search query at block 536, the number of media items obtained (or that are obtainable) from the search query can be determined. If the number of media items obtained is one or more, then it can be determined that at least one media item corresponding to the third primary media search query can be obtained. For example, the third primary media search query for the media-related request "Jack Ryan," can return at least the movies "Patriot Games," and "Clear and Present Danger." Thus, in this example, it can be determined that at least one media item corresponding to the third primary media search query can be obtained. In accordance with a determination that at least one media item corresponding to the third primary media search query can be obtained, block 540 can be performed. As will become evident in the description below, the determination at block 538 can be desirable to ensure that at least one media item is obtained for the third primary media search query performed at block 536. This can prevent the situation where no media items are displayed for a media search request and can save the user the trouble of having to provide another media search request, which improves user experience.

Figure 6E:
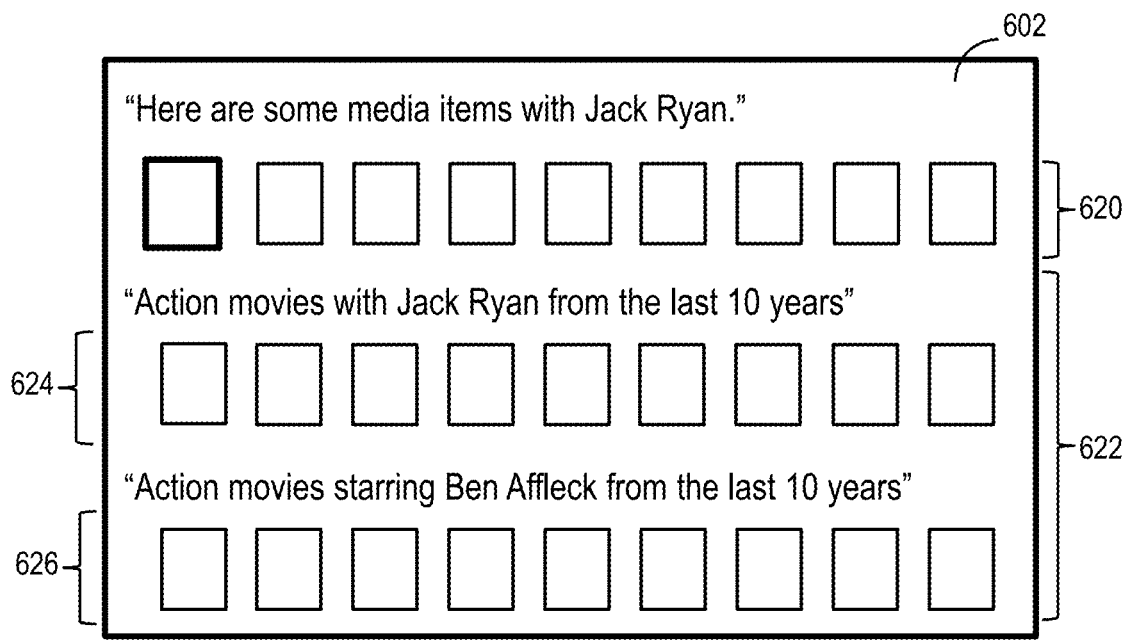

At block 540 of process 500, third primary set of media items 620 can be displayed on the display unit via user interface 602. In particular, as shown in FIG. 6E, display of primary set of media items 604 on the display unit can be replaced with display of third primary set of media items 620. Block 540 can be similar to block 522. Third primary set of media items 620 can be displayed according to the relevancy score associated with each media item. For example, with reference to FIG. 6E, third primary set of media items 620 can be arranged in decreasing order of relevancy score from left to right on user interface 602.

Figure 6F:
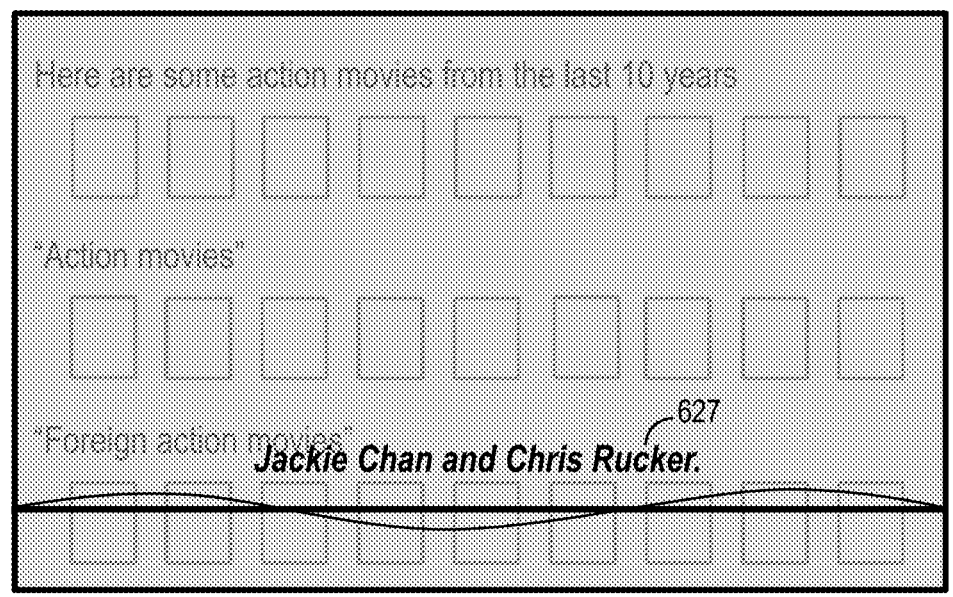

With reference back to block 538, in some examples, it can be determined that at least one media item corresponding to the third primary media search query cannot be obtained. For example, the media-related request or the corresponding text representation from STT processing may define incorrect parameter values or parameter values that are different from those actually intended by the user. In one such example, as shown in FIG. 6F, the media-related request may be "Jackie Chan and Chris Rucker" (represented by text 627). In this example, no media items may be obtained from performing the third primary media search query corresponding to this media-related request, and thus it can be determined that at least one media item corresponding to the third primary media search query cannot be obtained. In other examples, the media-related request may define incompatible parameters, such as "Jackie Chan" and "Spiderman," or "Graphic violence" and "Suitable for young children." In accordance with a determination that at least one media item corresponding to the third primary media search query cannot be obtained, block 542-548 can be performed to present the user with alternative results that are likely to satisfy the user's actual intent.

At block 542 of process 500, the least pertinent parameter value of the third primary media search query can be identified. In particular, a salience score for each parameter value in the third primary media search query can be determined based on factors such as the popularity of media items having the parameter value, the frequency of occurrence of the parameter value in previous media search requests, or the frequency of occurrence of the parameter value in a population of media items. The least pertinent parameter value can be identified as the parameter value with the lowest salience score. For example, between the parameter values "Jackie Chan" and "Chris Rucker," the parameter value "Chris Rucker" can have the lower salience score since Chris Rucker is a football athlete while Jackie Chan is popular actor. Thus Jackie Chan is associated with a greater number of media items and previous media search queries than Chris Rucker. Accordingly, in this example, the parameter value "Chris Rucker" can be determined to be the least pertinent parameter value.

At block 544 of process 500, one or more alternative parameter values can be determined. The one or more alternative parameter values can be determined based on the identified least pertinent parameter value. For example, fuzzy string matching can be performed between the identified least pertinent parameter value and a plurality of media-related parameter values in a data structure. In particular, the parameter value in the data structure with the shortest edit distance within a predetermined threshold can be determined to be an alternative parameter value. For example, based on fuzzy string matching of the parameter value "Chris Rucker," the parameter value "Chris Tucker" can be determined to have the shortest edit distance among a plurality of media-related parameter values in a data structure. Thus, in this example, "Chris Tucker" can be determined to be an alternative parameter value.

Additionally, or alternatively, one or more alternative parameter values can be determined based on the other parameter values in the third primary media search query (e.g., parameter values other than the least pertinent parameter value). In particular, parameter values closely related to the other parameter values in the third primary media search query can be determined. For example, it can be determined that parameter values such as "action movies" and "martial arts" are closely related to the parameter value "Jackie Chan," based on the existence of multiple media items starring "Jackie Chan" that also have the parameter values of "action movies" and "martial arts.

At block 546 of process 500, fourth primary set of media items can be obtained to satisfy the primary user intent. Block 546 can be similar to block 520. In particular, one or more alternative primary media search queries can be generated. The one or more alternative primary search queries can be generated using the one or more alternative parameter values determined at block 544. For example, in FIGS. 6F-G, where the media-related request is "Jackie Chan and Chris Rucker" and the alternative parameter value is determined to be "Chris Tucker," the alternative primary search query can be a search for media items with the parameter values "Jackie Chan" and "Chris Tucker." Thus, in this example, the least pertinent parameter value can be replaced by an alternative parameter value that more likely reflects the actual intent of the user. The one or more alternative primary media search queries can then be performed to obtain fourth primary set of media items 628. In the present example of searching for media items with parameter values "Jackie Chan" and "Chris Tucker," fourth primary set of media items 628 can include movies, such as "RUSH HOUR," "RUSH HOUR 2," or "RUSH HOUR 3."

Figure 6G:
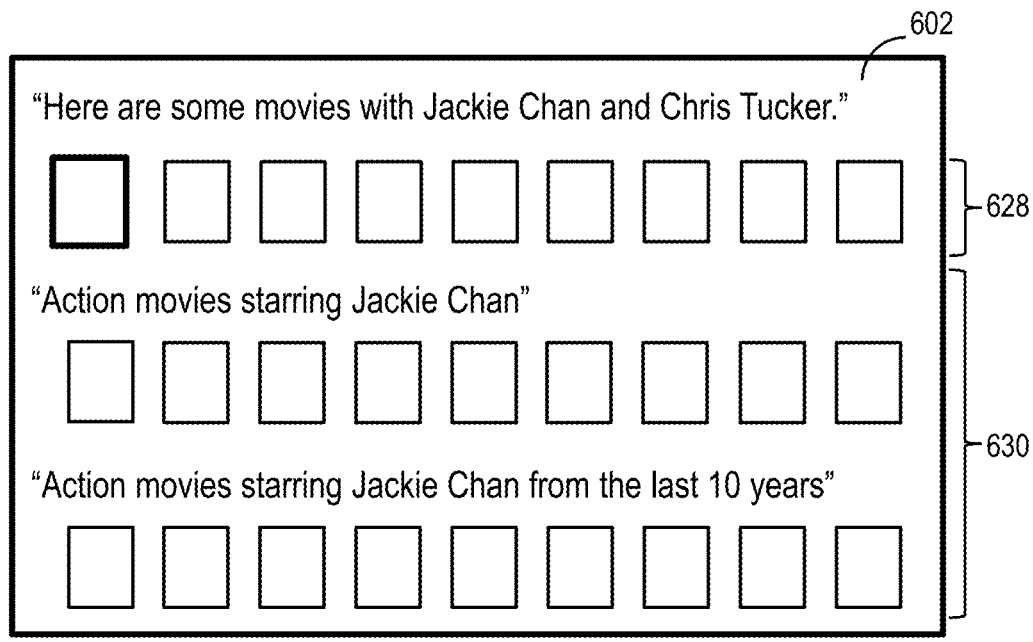
Figure 6H:
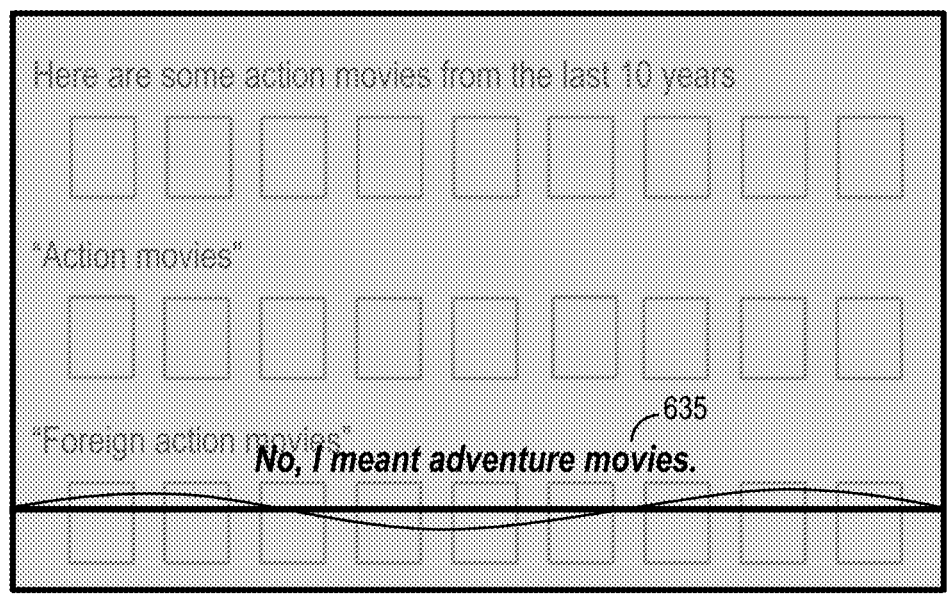
Figure 6I:
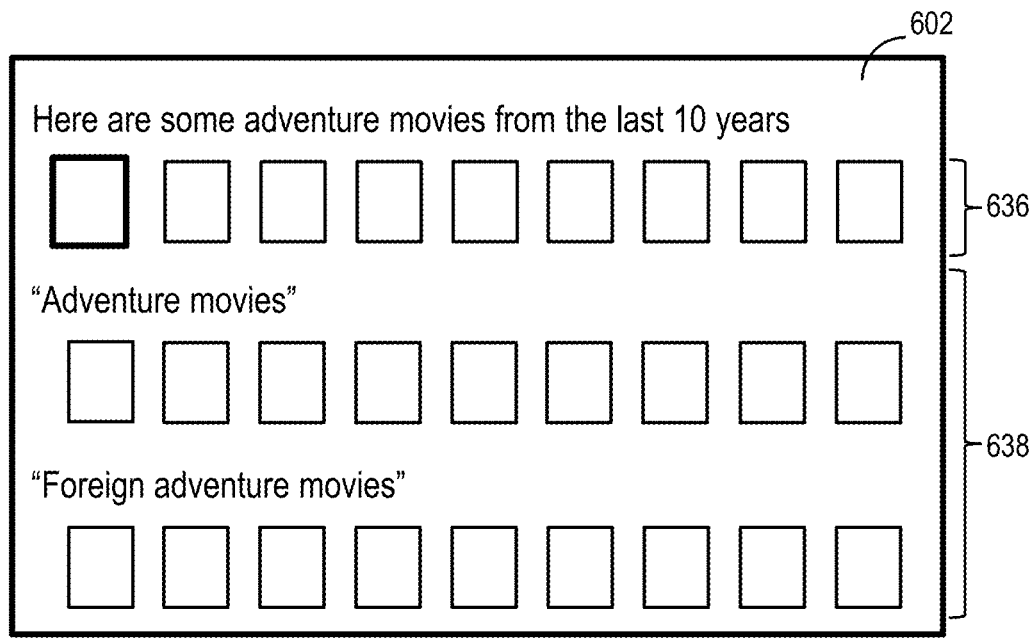
Figure 6J:
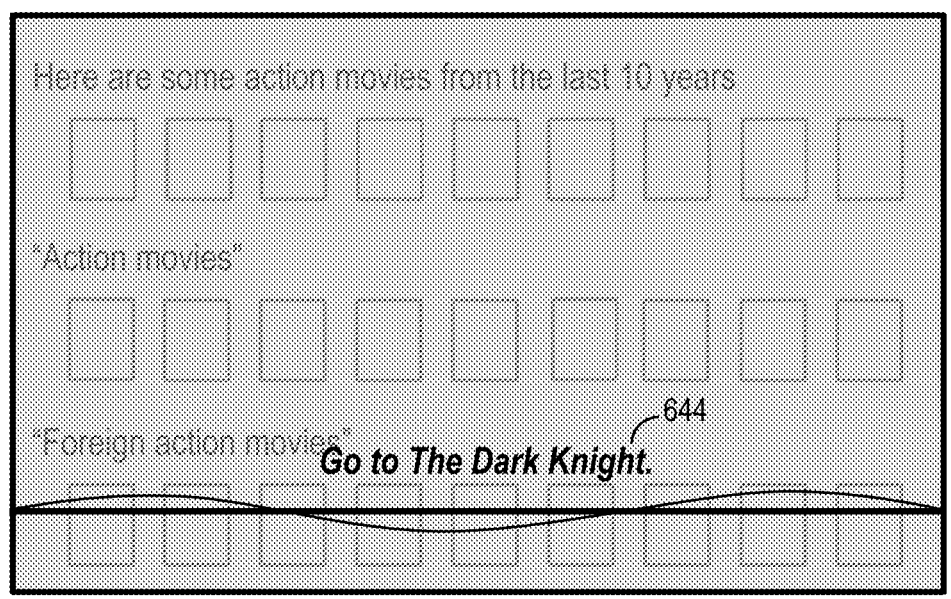
Figure 6K:
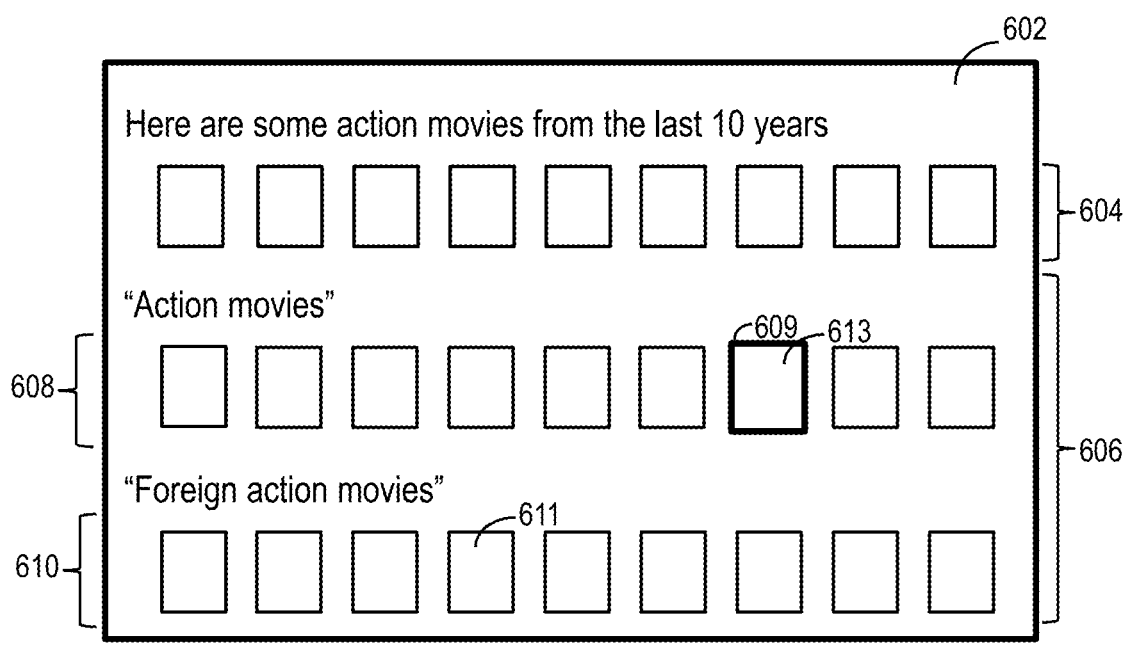

At block 548 of process 500, fourth primary set of media items 628 can be displayed on the display unit via user interface 602. Block 548 can be similar to block 522. In particular, as shown in FIG. 6G, display of primary set of media items 604 on the display unit can be replaced with display of fourth primary set of media items 628.

At block 550 of process 500, a determination can be made as to whether one or more previous user intents exist. The one or more previous user intents can correspond to one or more previous media-related requests received prior to the media-related request of block 506. An example of a previous media-related request can include the previously received media-related request corresponding to the primary media search query and primary set of media items 604 of block 502. The determination can be made based on analyzing the history of previous user intents stored on the media device (e.g., media device 104) or a server (e.g., DA server 106). In some examples, only previous user intents within a relevant timeframe are taken into account when determining whether one or more previous user intents exist. The relevant time frame can refer to a predetermined timeframe prior to when the media-related request of block 506 is received. In other examples, the relevant time frame can be based on an interactive session with the digital assistant. In particular, the media-related request of block 506 can be part of an interactive session with the digital assistant that includes a sequence of media-related requests. In these examples, the relevant timeframe can be from the time at which the interactive session was initiated to the time at which the interactive session was terminated. A determination can be made as to whether the interactive session contains one or more previous media-related requests received prior to the media-related request of block 506. If the interactive session contains one or more previous media-related requests, then it can be determined that one or more previous user intents exist. The one or more previous user intents and the primary user intent can thus be associated with the same interactive session with the digital assistant. Conversely, if the interactive session does not contain one or more previous media-related requests, then it can be determined that one or more previous user intents do not exist. In response to determining that one or more previous user intents exist, block 552 can be performed. Alternatively, in response to determining that one or more previous user intents do not exist, block 560 can be performed.

At block 552 of process 500, one or more secondary user intents can be determined. The one or more secondary user intents can be determined based on the primary user intent of block 510 and the one or more previous user intents determined to exist at block 550. Specifically, the one or more secondary user intents can include a combination of the primary user intent and the one or more previous user intents. In some examples, the one or more previous user intents can be determined based on the media-related request history of the user on the media device.

Figure 5D:
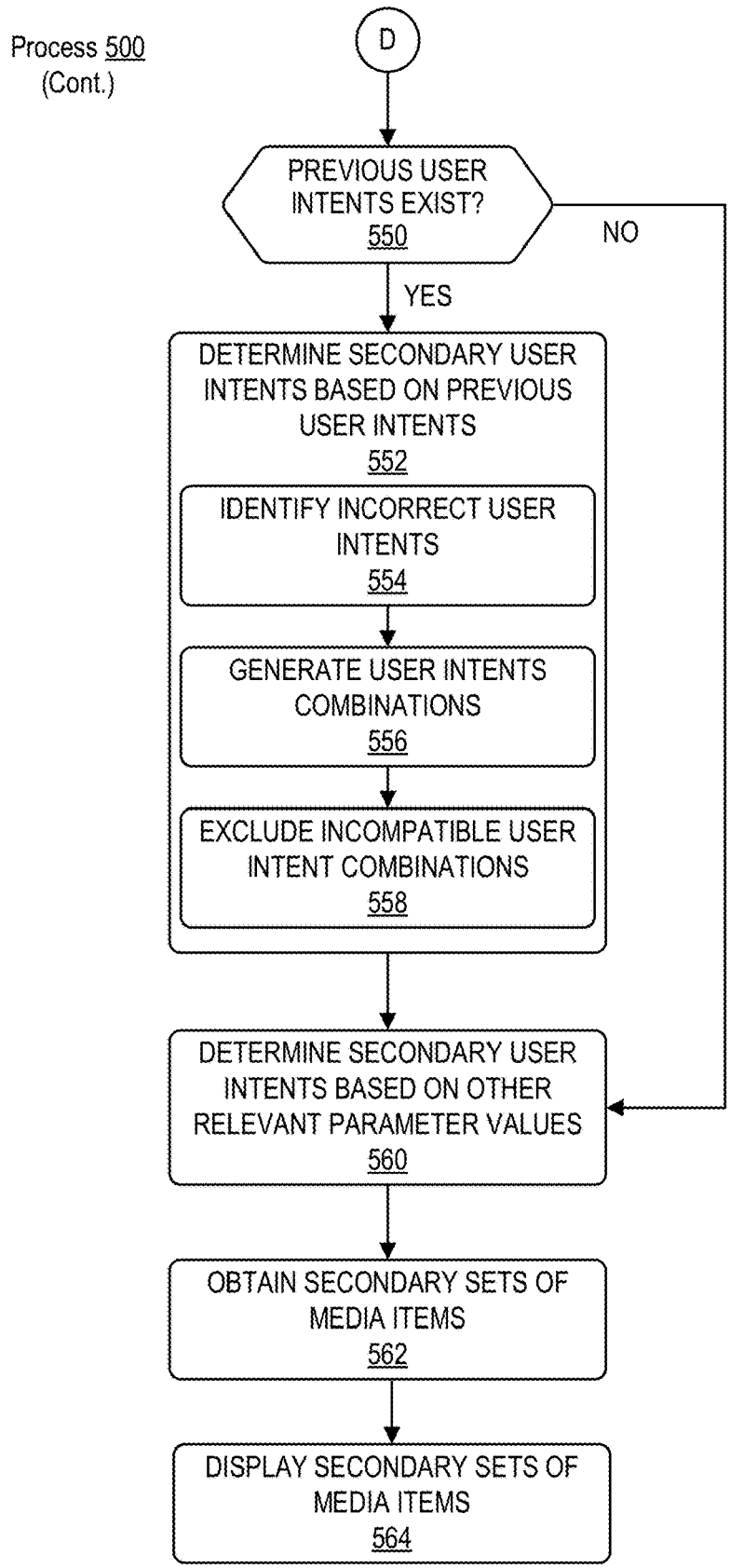
Figure 5E:
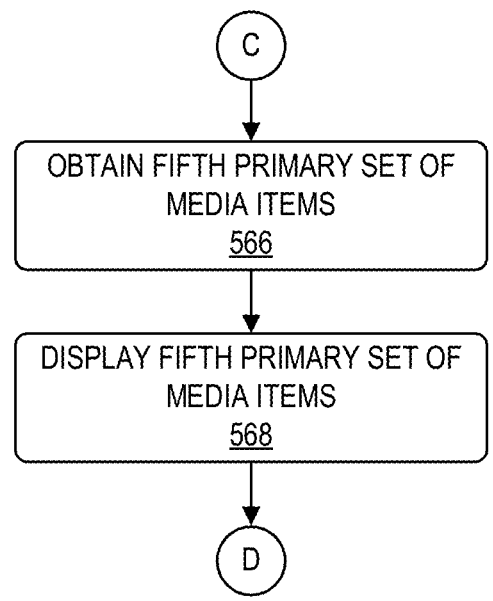

Returning to the example of FIGS. 6D-E, the primary user intent can be the intent to search for media items with the character "Jack Ryan." In one example, a first previous user intent can be the intent to search for action movies from the past 10 years. In addition, a second previous user intent can be the intent to search for media items starring Ben Affleck. The secondary user intents can thus be a combination of two or more of these user intents. In particular, one secondary user intent can be a combination of the primary user intent and the first previous user intent (e.g., the user intent to search for action movies with Jack Ryan from the past 10 years). Another secondary user intent can be a combination of the first previous user intent and the second previous user intent (e.g., the user intent to search for action movies starring Ben Affleck from the last 10 years). Block 552 can be performed using the natural language processing module (natural language processing module 432) of the media device. As shown in FIG. 5D, block 552 can include blocks 554-560.

At block 554 of process 500, incorrect user intents among the one or more previous user intents can be identified. In particular, the one or more previous user intents can be analyzed to determine whether any incorrect user intents are included. A previous user intent can be determined to be incorrect if it is indicated, explicitly or implicitly, as being incorrect by a subsequent previous user intent. For example, the one or more previous user intents may include user intents corresponding to the following sequence of previous media-related requests:

[A] "Show me some James Bond movies."
[B] "Just the ones with Daniel Smith."
[C] "No, I meant Daniel Craig."

In this example, based on the explicit phrase "No, I meant . . . ," the previous user intent associated with request [C] can be determined to be an intent to correct the previous user intent associated with request [B]. Thus, in this example, the previous user intent associated with request [B] that precedes request [C] can be determined to be incorrect. It should be appreciated that in other examples, request [C] can implicitly indicate that request [B] is incorrect. For example, request [C] can alternatively be simply "Daniel Craig." Based on the similarity of the strings "Daniel Craig" to "Daniel Smith" and the improved relevancy associated with the parameter value "Daniel Craig" as opposed to "Daniel Smith," the previous user intent associated with request [C] can be determined to be an intent to correct the previous user intent associated with request [B].

In other examples, a previous user intent can be determined to be incorrect based on a user selection of a media item that is inconsistent with the previous user intent. For example, a previous request can be: "Show me videos produced by Russell Simmons." In response to this previous request, a primary set of media items including videos produced by Russell Simmons may have been displayed for user selection. Further, additional sets of media items relevant to the previous request may have been displayed with the primary set of media items. In this example, it can be determined that the user selected a media item in the additional sets of media items that was produced by "Richard Simmons" rather than "Russell Simmons." Based on this user selection of a media item that was inconsistent with the previous user intent of searching for videos produced by Russell Simmons, it can be determined that the previous user intent is incorrect. In other words, it can be determined that the correct user intent should be searching for videos produced by "Richard Simmons" rather than "Russell Simmons."

In accordance with a determination that the one or more previous user intents include incorrect previous user intents, the incorrect previous user intents may not be used to determine the one or more secondary user intents. In particular, the incorrect previous user intents may be excluded and thus may not be used to generate the combinations of user intents at block 556 for determining the one or more secondary user intents. However, in some examples, the corrected user intent can be used to generate the combination of user intents and determine the one or more secondary user intents. For instance, in the respective examples described above, the corrected previous user intent associated with "Daniel Craig" (e.g., searching for James Bond movies with Daniel Craig) and the corrected previous user intent associated with "Richard Simmons" (e.g., searching for videos produced by Richard Simmons) can be used to determine the one or more secondary user intents.

At block 556 of process 500, a plurality of user intent combinations can be generated based on the primary user intent and the one or more previous user intents. In an illustrative example, the media device may have received the following sequence of media-related requests, where the primary user intent is associated with request [G] and the one or more previous user intents are associated with requests [D]-[F].

[D] "Movies starring Keanu Reeves."
[E] "Shows containing graphic violence."
[F] "Movies suitable for young children"
[G] "Cartoons."

In this example, the plurality of user intent combinations can include any combination of the primary user intent and the one or more previous user intents associated with requests [D] through [G]. One exemplary user intent combination can be a search for movies starring Keanu Reeves with graphic violence (e.g., combination based on requests [D] and [E]). Another exemplary user intent combination can be a search for cartoon movies that are suitable for young children (e.g., combination based on request [F] and [G]).

At block 558 of process 500, incompatible user intent combinations can be excluded. In particular, the incompatible user intent combinations can be identified and the one or more secondary user intents may not be determined based on the identified incompatible user intent combinations. In some examples, an incompatible user intent combination may be a user intent combination that does not correspond to any media item. Specifically, for each user intent combination, a corresponding media search can be performed. If no media item is obtained for a particular media search, the corresponding user intent combination can be determined to be an incompatible user intent combination. For example, a user intent combination can be based on requests [E] and [F], described above. In this example, a corresponding media search for movies suitable for children that contain graphic violence can be performed. However, such a media search may not yield any media items. Thus, in this example, the user intent combination based on requests [E] and [F] can be determined to be an incompatible user intent combination. It should be appreciated that in other examples, different predetermined threshold values can be established for determining incompatible user intent combinations. For example, a user intent combination that does not correspond to greater than a predetermined number of media items can be determined to be incompatible.

In other examples, an incompatible user intent combination can be determined based on the parameter values associated with the user intent combination. In particular, certain parameter values can be predetermined to be incompatible. For example, the parameter value of "graphic violence" can be predetermined to be incompatible with the parameter value "suitable for young children." Thus, a user intent combination containing two or more parameter values that are predetermined to be incompatible can be determined to be an incompatible user intent combination. Further, it can be predetermined that certain parameters require a singular value. For example, the parameters of "media title," "media type," and "MOTION PICTURE ASSOCIATION OF AMERICA film-rating" can each be associated with no more than one parameter value in a user intent combination. In particular, the combination of a first user intent for searching for movies and a second user intent for searching for songs would be an incompatible combination. Thus, a user intent combination can be determined to be incompatible if it contains more than one parameter value for a parameter predetermined to require a singular value. Incompatible user intent combinations can be excluded such that the combinations are not used to determine the one or more secondary user intents at block 552. In particular, the one or more secondary user intents may not include any incompatible user intent combinations. Removing incompatible user intent combinations from consideration can be desirable to increase the relevance of media items displayed for user selection.

The one or more secondary user intents can be determined based on the remaining user intent combinations that were not determined to be incompatible. In particular, the user intents of each remaining user intent combination can be merged to generate the one or more secondary user intents. Further, each of the remaining user intent combinations can be associated with at least one media item (or at least a predetermined number of media items). In some examples, the one or more secondary intents can include the one or more remaining user intent combinations.

Returning back to the example with requests [D]-[G] described above, a secondary user intent of the one or more secondary user intents can include a combination of the primary user intent (e.g., primary user intent associated with request [G]) and a previous user intent of the one or more previous user intents (e.g., previous user intent associated with request [F]). For example, the secondary user intent can be a media search for cartoon movies that are suitable for young children. Additionally, a secondary user intent of the one or more secondary user intents can include a combination of two or more previous user intents of the one or more previous user intents (e.g., previous user intent associated with requests [D] and [E]). For example, the secondary user intent can be a media search for movies with graphic violence starring Keanu Reeves.

At block 560 of process 500, one or more secondary user intents can be generated based on other relevant parameter values. The one or more secondary user intents determined at block 560 can be in addition to, or alternative to, the one or more secondary intents determined at block 552. The other relevant parameter values may be based on information other than the media search history of the user on the media device. In particular, the information used to determine the other relevant parameter values can reflect the media interests and habits of the user, and thus can reasonably predict the actual intent of the user.

In some examples, the other relevant parameter values can be based on the media selection history of the user on the media device. In particular, the other relevant parameter values can include parameter values associated with media items previously selected by the user for consumption (e.g., selected prior to receiving the media-related request at block 506). In some examples, the other relevant parameter values can be based on the media watch list of the user on the media device. The media watch list can be a user-defined list of media items that the user is interested in or wishes to consume in the near future. Parameter values associated with the user selection history or the user media watch list can thus reflect the media interests or habits of the user. In some examples, the other relevant parameters can be based on the media search history of the user on a device external to the media device. In particular, the history of media-related searches performed on an external media device (e.g., user device 122), can be obtained from the external media device. These media-related searches can be web searches, ITUNES STORE searches, local media file searches on the device, or the like. The other relevant parameter values can thus include parameter values derived from the media-related search history of the external media device.

In some examples, the other relevant parameter values can be based on a media item on which the user interface is focused. For example, with reference to FIG. 6A, cursor 609 can be on media item 611 while the media-related request is received at block 506. Thus, it can be determined that the focus of user interface 602 is on media item 611 while the media-related request is received at block 506. In this example, the other relevant parameter values can be contextually-related to media item 611. Specifically, the other relevant parameter values can include one or more parameter values of media item 611. In some examples, the other relevant parameter values can be based on text associated with the media items displayed on the display unit while the media-related request is received at block 506. For example, in FIG. 6A, a plurality of text associated with primary set of media items 604 and secondary sets of media items 606 can be displayed on the display unit while the media-related request is received at block 506. The plurality of text can describe parameter values of the associated media items. The other relevant parameter values can thus include one or more parameter values described by the plurality of text.

It should be recognized that other information internal or external to the media device can be used to determine the other relevant parameter values. For instance, in some examples, the other relevant parameter values can be determined in a similar manner as the additional parameter values identified at block 528.

A ranking score can be determined for each of the one or more secondary user intents of blocks 552 and 560. The ranking score can represent the likelihood that the secondary user intent corresponds to the actual user intent of the user. In some examples, a higher ranking score can represent a higher likelihood that the respective secondary user intent corresponds to the actual user intent. As described below, the ranking score can be determined based on similar information used to derive the one or more secondary user intents.

In some examples, the ranking score for each of the one or more secondary user intents can be determined based on the media-related request history (e.g., media search history) of the user or of a plurality of users. In particular, the ranking score can be determined based on the time and the order in which each of the media-related requests and the one or more previous media-related requests were received. Secondary user intents that are based on the more recently received media search request can be more likely to have a higher ranking score than secondary user intents that are based on the earlier received media-related request. For instance, in the above described example of requests [D]-[G], request [G] can be the most recently received media-related request, whereas request [D] can be the earliest received media-related request. In this example, a secondary user intent based on request [G] can be more likely to have a higher ranking score than a secondary user intent based on request [D].

Further, the ranking score can be based on the frequency of occurrence of the parameter values in the media-related request history of the user or of a plurality of users. For example, if the parameter value "Keanu Reeves" occurs more frequently than the parameter value "graphic violence" in the media-related request history of the user or the media-related request history of a plurality of users, then secondary user intents containing the parameter value "Keanu Reeves" can be more likely to have a higher ranking score than secondary user intents containing the parameter value "graphic violence."

In some examples, the ranking score for each of the one or more secondary user intents can be determined based on a selection history of the user or a plurality of users. The user selection history can include a list of media items that were previously selected by the user or the plurality of users for consumption. Secondary user intents that include the parameter values of one or more previously selected media items can be more likely to have a higher ranking score than secondary user intents that do not include the parameter values of any previously selected media item. In addition, secondary user intents that include the parameter values of a more recently selected media item can be more likely to have a higher ranking score than secondary user intents that include the parameter values of an earlier selected media item. Further, secondary user intents having parameter values that occur more frequently among previously selected media items can be more likely to have a higher ranking score than secondary user intents having parameter values that occur less frequently among previously selected media items.

In some examples, the ranking score for each of the one or more secondary user intents can be determined based on a media watch list of the user or a plurality of users. For example, secondary user intents that include the parameter values of one or more media items on the media watch list can be more likely to have a higher ranking score than secondary user intents that do not include the parameter values of any media items on the media watch list.

At block 562 of process 500, one or more secondary sets of media items can be obtained. Block 562 can be similar to block 520. In particular, one or more secondary media search queries corresponding to the one or more secondary user intents of blocks 552 and/or 560 can be generated. The one or more secondary media search queries can be performed to obtain one or more secondary sets of media items 622. For example, with reference back to FIG. 6E, a first secondary media search query for action movies with Jack Ryan from the last 10 years can be generated and performed to obtain secondary set of media items 624. Additionally, a second secondary media search query for action movies starring Ben Affleck from the last 10 years can be generated and performed to obtain secondary set of media items 626.

At block 564 of process 500, the one or more secondary sets of media items can be displayed on the display unit. Block 564 can be similar to block 534. As shown in FIG. 6E, third primary set of media items 620 can be displayed at a top row of user interface 602. The secondary sets of media items 624 and 626 can be displayed in subsequent rows of user interface 602 below the top row. Each row of the subsequent rows can correspond to a secondary user intent of the one or more secondary user intents of block 552 and/or 560.

The one or more secondary sets of media items can be displayed in accordance with the ranking scores of the corresponding one or more secondary user intents. In particular, the secondary sets of media items corresponding to secondary user intents with higher ranking scores can be displayed more prominently (e.g., in a higher row closer to the top row) than the secondary sets of media items corresponding to secondary user intents with lower ranking scores.

With reference back to block 510, in accordance with a determination that the primary user intent does not comprise a user intent to perform a new media search query, one or more of blocks 516-518 can be performed. At block 516 of process 500, a determination can be made as to whether the primary user intent comprises a user intent to correct a portion of the primary media search query. The determination can be made based on an explicit word or phrase indicating a user intent to correct a portion of the primary media search query. Specifically, it can be determined whether the media-related request includes a predetermined word or phrase indicating a user intent to correct a portion of the primary media search query. For example, with reference to FIGS. 6H-I, the media-related request can be: "No, I meant adventure movies" (represented by text 635). In this example, based on the explicit phrase "No, I meant . . ." occurring at the beginning of the media-related request, it can be determined that the primary user intent comprises a user intent to correct a portion of the primary media search query. Specifically, the primary user intent can be determined to be a user intent to correct the primary media search query from searching for action movies from the last 10 years to searching for adventure movies from the last 10 years. Other examples of predetermined words or phrases indicating a user intent to correct a portion of the primary media search query can include "no," "not," "I mean," "wrong," or the like.

In other examples, the determination at block 516 can be made based on a similarity between a parameter value in the media-related request and a parameter value in the primary media search query. For instance, in one example, the previously received media-related request associated with the primary media search query can be: "Jackie Chan and Chris Rucker" and the media-related request can be: "Chris Tucker." Based on the determined edit distance between the parameter values "Chris Rucker" and "Chris Tucker" being less than a predetermined value, it can be determined that the primary user intent comprises a user intent to correct the parameter value "Chris Rucker" in the primary media search query to "Chris Tucker." Additionally or alternatively, the sequence of phonemes representing "Chris Rucker" and "Chris Tucker" can be compared. Based on the sequence of phonemes representing "Chris Rucker" being substantially similar to the sequence of phonemes representing "Chris Tucker," it can be determined that the primary user intent comprises a user intent to correct "Chris Rucker" in the primary media search query to "Chris Tucker."

Further, the salience of the parameter value "Chris Rucker" can be compared to the salience of the parameter value "Chris Tucker" with respect to the parameter value "Jackie Chan." In particular, a media search can be performed using the parameter value "Jackie Chan" to identify a set of media items related to Jackie Chan. The salience of "Chris Rucker" and "Chris Tucker" with respect to "Jackie Chan" can be based on the number of media items among the set of media items related to Jackie Chan that are associated with each of the two parameter values. For example, "Chris Tucker" can be determined to be associated with significantly more media items among the set of media items related to Jackie Chan than "Chris Rucker." Thus, the salience of "Chris Tucker" can be determined to be significantly more than the salience of "Chris Rucker" with respect to "Jackie Chan." Based on this compared salience, it can be determined that the primary user intent comprises a user intent to correct "Chris Rucker" in the primary media search query.

In accordance with a determination that the primary user intent comprises a user intent to correct a portion of the primary media search query, the previous user intent associated with the primary media search query can be removed from consideration when determining one or more secondary user intents (e.g., block 552) associated with the media-related request. For example, the previous user intent associated with the previously received media-related request of "Jackie Chan and Chris Rucker" can be removed from consideration when determining one or more secondary user intents. Instead, the user intent associated with the corrected media-related request "Jackie Chan and Chris Tucker" can be considered when determining one or more secondary user intents.

Additionally, in accordance with a determination that the primary user intent comprises a user intent to correct a portion of the primary media search query, one or more of blocks 566-568 can be performed. At block 566 of process 500, the fifth primary set of media items (628 or 636) can be obtained. Block 566 can be similar to block 520. In particular, a fifth primary media search query corresponding to the primary user intent can be generated. The fifth primary media search query can be based on the media-related request and the primary media search query. Specifically, the portion of the primary media search query can be corrected in accordance with the media-related request to generate the fifth primary media search query. Returning to the example where the primary media search query is to search for media items starring "Jackie Chan" and "Chris Rucker" and the media-related request is "Chris Tucker," the primary media search query can be corrected to generate the fifth primary media search query of searching for media items starring "Jackie Chan" and "Chris Tucker." The fifth primary media search query can then be performed to obtain a fifth primary set of media items.

At block 568 of process 500, the fifth primary set of media items (628 or 636) can be displayed on the display unit via a user interface (e.g., user interface 602). In particular, the display of the primary set of media items (e.g., primary set of media items 604) can be replaced with the display of the fifth primary set of media items (628 or 636). Block 540 can be similar to block 522. Further, in some examples, blocks 550-564 can be performed to obtain and display one or more secondary set of media items (628 or 636) with the fifth primary set of media items to provide the user with additional options.

With reference back to 510, in accordance with a determination that the primary user intent does not comprise a user intent to correct a portion of the primary media search query, block 518 can be performed. At block 518 of process 500, a determination can be made as to whether the primary user intent comprises a user intent to change a focus of the user interface (e.g., user interface 602) displayed on the display unit. The user interface can include a plurality of media items. In some examples, the determination at block 518 can be made based on an explicit word or phrase in the media-related request that corresponds to a user intent to change a focus of the user interface. In one example, the media-related request can be: "Go to THE DARK KNIGHT". In this example, it can be determined that the phrase "Go to . . . " is a predetermined phrase corresponding to a user intent to change a focus of the user interface. Other examples of predetermined words or phrases that correspond to a user intent to change a focus of a user interface can include "Select," "Move to," "Jump to," "Play," "Buy," or the like. Based on the predetermined word or phrase, it can be determined that the primary user intent comprises a user intent to change a focus of the user interface.

In other examples, the determination at block 518 can be made implicitly based on text corresponding to the media items displayed in the user interface. For example, with reference to FIG. 6A, media items 604 and 606 can be associated with text describing one or more parameter values of media items 604 and 606. In particular, the text can describe parameter values of media items 604 and 606, such as the media title, the actors, the release date, or the like. As described above, at least a portion of this text can be displayed on user interface 602 in connection with the respective media items. The determination at block 518 can be made based on this text describing one or more parameter values of media items 604 and 606. In the present example, media item 613 can be the movie "THE DARK KNIGHT" and the text can include the media title "THE DARK KNIGHT" associated with media item 613. Based on a determination that the parameter value "THE DARK KNIGHT" defined in the media-related request matches the media title "THE DARK KNIGHT" of the text associated with media item 613, it can be determined that the primary user intent comprises a user intent to change a focus of user interface 602 from media item 611 to media item 613. It should be recognized that in some examples, the displayed text may not include all the parameter values of media items displayed via user interface 602. In these examples, the determination at block 518 can be also based on parameter values of displayed media items that are not described in the displayed text.

In accordance with a determination that the primary user intent comprises a user intent to change a focus of the user interface, block 570 can be performed. At block 570 of process 500, a focus of the user interface can be changed from a first media item to a second media item. For example, with reference to FIG. 6K, the position of cursor 609 of user interface 602 can be changed from media item 611 to media item 613. In some examples, changing the focus of user interface 602 can include selecting a media item. For example, media item 613 can be selected at block 570. Selecting media item 613 can cause information associated with media item 613 to be displayed (e.g., movie preview information). Additionally or alternatively, selecting media item 613 can cause media content associated with media item 613 to be played on the media device and displayed on the display unit.

Although certain blocks of processes 500 are described above as being performed by a device or system (e.g., media device 104, user device 122, or digital assistant system 400), it should be recognized that in some examples, more than one device can be used to perform a block. For example, in blocks where a determination is made, a first device (e.g., media device 104) can obtain the determination from a second device (e.g., server system 108). Thus, in some examples, determining can refer to obtaining a determination. Similarly, in blocks where content, objects, text, or user interfaces are displayed, a first device (e.g., media device 104) can cause the content, objects, text, or user interfaces to be displayed on a second device (e.g., display unit 126). Thus, in some examples, displaying can refer to causing to display.

Further, it should be recognized that, in some examples, items (e.g., media items, text, objects, graphics, etc.) that are displayed in a user interface can also refer to items that are included in the user interface, but not immediately visible to the user. For example, a displayed item in a user interface can become visible to the user by scrolling to a suitable region of the user interface.

5. Electronic Devices

Figure 7:
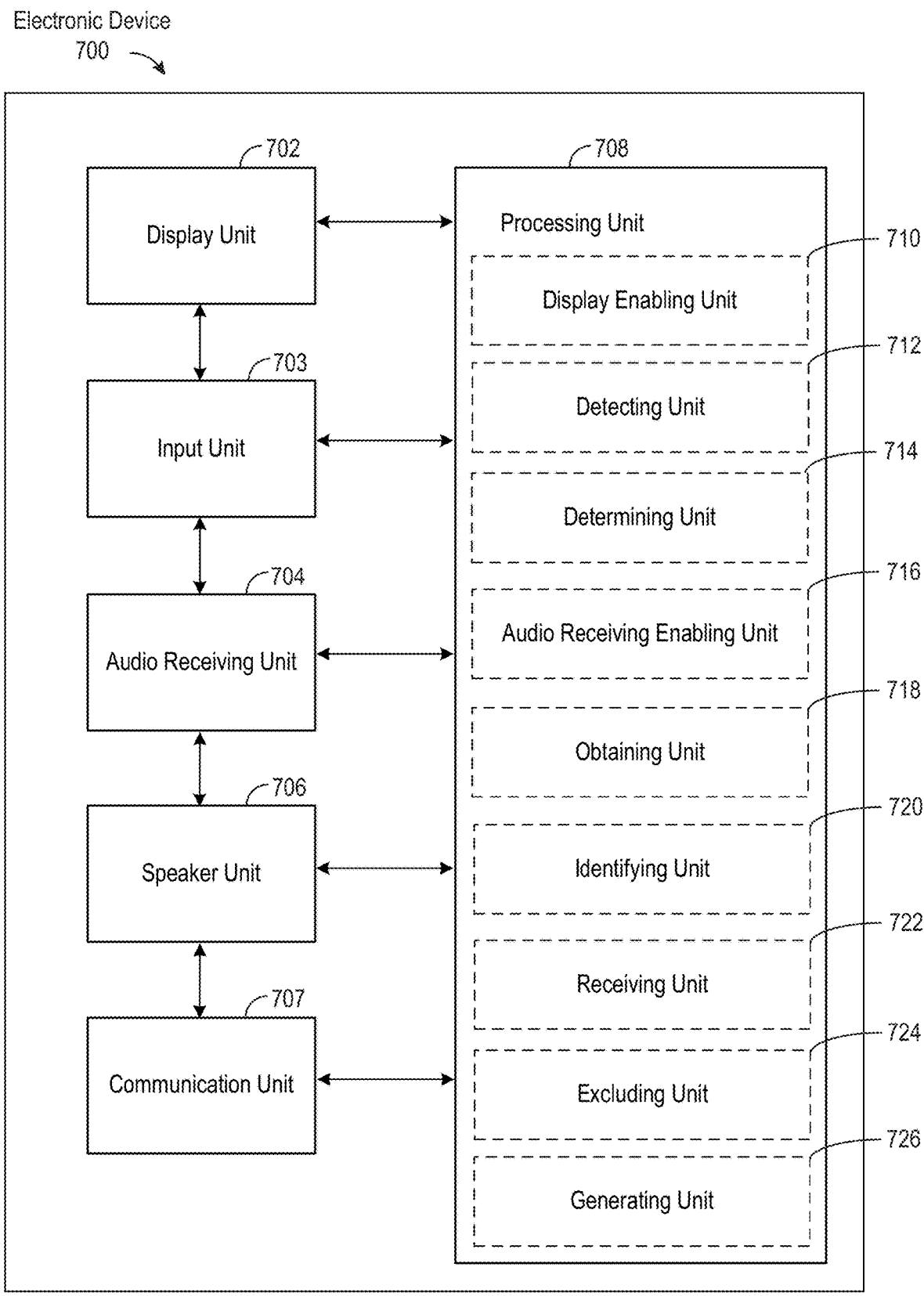
FIG. 7 illustrates a functional block diagram of an electronic device configured to operate a digital assistant of a media system according to various examples.

In accordance with some examples, FIG. 7 shows a functional block diagram of an electronic device 700 configured in accordance with the principles of various described examples to, for example, provide voice control of media playback and real-time updating of virtual assistant knowledge. The functional blocks of the device can be implemented by hardware, software, or a combination of hardware and software to carry out the principles of the various described examples. It is understood by persons of skill in the art that the functional blocks described in FIG. 7 can be combined or separated into sub-blocks to implement the principles of the various described examples. Therefore, the description herein optionally supports any possible combination or separation or further definition of the functional blocks described herein.

As shown in FIG. 7, electronic device 700 can include input unit 703 configured to receive user input, such as tactile input, gesture input, and text input (e.g., remote control 124, or the like), audio receiving unit 704 configured to receive audio data (e.g., microphone 272, or the like), speaker unit 706 configured to output audio (e.g., speakers 268, or the like), and communication unit 707 (e.g., communication subsystem 224, or the like) configured to send and receive information from external devices via a network. In some examples, electronic device 700 can optionally include a display unit 702 configured to display media, user interfaces, and other content (e.g., display unit 126, or the like). In some example, display unit 702 can be external to electronic device 700. Electronic device 700 can further include processing unit 708 coupled to input unit 703, audio receiving unit 704, speaker unit 706, communication unit 707, and optionally display unit 702. In some examples, processing unit 708 can include display enabling unit 710, detecting unit 712, determining unit 714, audio receiving enabling unit 716, obtaining unit 718, identifying unit 720, receiving unit 722, excluding unit 724, and generating unit 726.

In accordance with some embodiments, processing unit 708 is configured to display (e.g., with display enabling unit 710) a primary set of media items on a display unit (e.g., with display unit 702 or a separate display unit). Processing unit 708 is further configured to detect (e.g., with detecting unit 712) a user input. Processing unit 708 is further configured to, in response to detecting a user input, receive audio input (e.g., with audio receiving enabling unit 716) at audio receiving unit 704. The audio input contains a media-related request in natural language speech form. Processing unit 708 is further configured to determine (e.g., with determining unit 714) a primary user intent corresponding to the media-related request. Processing unit 708 is further configured to determine (e.g., with determining unit 714) whether the primary user intent comprises a user intent to narrow a primary media search query corresponding to the primary set of media items. Processing unit 708 is further configured to, in accordance with a determination that the primary user intent comprises a user intent to narrow the primary media search query, generate (e.g., with obtaining unit 718), based on the media-related request and the primary media search query, a second primary media search query that corresponds to the primary user intent, perform (e.g., with obtaining unit 720) the second primary media search query to obtain a second primary set of media items. Processing unit 708 is further configured to replacing display of the primary set of media items on the display unit with display of the second primary set of media items (e.g., with display enabling unit 710).

In some examples, determining whether the primary user intent comprises a user intent to narrow the primary media search query comprises determining whether the media-related request includes a word or phrase corresponding to a user intent to narrow the primary media search query.

In some examples, the second primary media search query includes one or more parameter values defined in the media-related request and one or more parameter values of the primary media search query. In some examples, the second primary set of media items is obtained based on the primary set of media items.

In some examples, the second primary media search query includes a set of parameter values. Processing unit 708 is further configured to identify (e.g., with identifying unit 720) a core set of parameter values from the set of parameter values, the core set of parameter values having fewer parameter values than the set of parameter values. Processing unit 708 is further configured to generate (e.g., with obtaining unit 718) one or more additional media search queries based on the core set of parameter values. Processing unit 708 is further configured to perform (e.g., with obtaining unit 718) the one or more additional media search queries to obtain one or more additional sets of media items. Processing unit 708 is further configured to display (e.g., with display enabling unit 710) the one or more additional sets of media items on the display unit.

In some examples, processing unit 708 is further configured to identify (e.g., with identifying unit 720) one or more additional parameter values based on a media selection history of a plurality of users. The one or more additional media search queries are generated using the one or more additional parameter values.

In some examples, the second primary set of media items is displayed at a top row of a user interface on the display unit and the one or more additional sets of media items are displayed at one or more subsequent rows of the user interface on the display unit.

In some examples, processing unit 708 is further configured to, in accordance with a determination that the primary user intent does not comprise a user intent to narrow the primary media search query, determine (e.g., with determining unit 714) whether the primary user intent comprises a user intent to perform a new media search query. Processing unit 708 is further configured to, in accordance with a determination that the primary user intent comprises a user intent to perform a new media search query, generate (e.g., with obtaining unit 718), based on the media-related request, a third primary media search query that corresponds to the primary user intent, determine (e.g., with determining unit 714) whether at least one media item corresponding to the third primary media search query can be obtained. Processing unit 708 is further configured to, in accordance with a determination that at least one media item corresponding to the third primary media search query can be obtained, perform (e.g., with obtaining unit 718) the third primary media search query to obtain a third primary set of media items and replace display of the primary set of media items on the display unit with display of the third primary set of media items (e.g., with display enabling unit 710).

In some examples, determining whether the primary user intent comprises a user intent to perform a new media search query further comprises determining whether the media-related request includes a word or phrase corresponding to a user intent to perform a new media search query. In some examples, determining whether the primary user intent comprises a user intent to perform a new media search query further comprises determining whether the media-related request includes a word or phrase corresponding to a parameter value of one or more media items.

In some examples, processing unit 708 is further configured to perform (e.g., with obtaining unit 718) the third primary media search query includes performing a normalized ranking of a plurality of candidate media items, where the plurality of candidate media items comprising a plurality of media types.

In some examples, determining the primary user intent includes determining a media type associated with the media-related request, where the third primary media search query is performed in accordance with the determined media type.

In some examples, performing the third primary media search query comprises identifying a candidate media item associated with a parameter value that is included in one or more media critic reviews of the identified candidate media item.

In some examples, performing the third primary media search query comprises identifying a candidate media item associated with a parameter value that is derived from closed captioning information of the identified candidate media item.

In some examples, processing unit 708 is further configured to, in accordance with a determination that no media items correspond to the third primary media search query, identify (e.g., with identifying unit 720) a least pertinent parameter value of the third primary media search query. Processing unit 708 is further configured to determine (e.g., with determining unit 714), based on the identified least pertinent parameter value, one or more alternative parameter values. Processing unit 708 is further configured to perform (e.g., with obtaining unit 718), using the one or more alternative parameter values, one or more alternative primary media search queries to obtain a fourth primary set of media items. Processing unit 708 is further configured to replacing display of the primary set of media items on the display unit with display of the fourth primary set of media items (e.g., with display enabling unit 710).

In some examples, processing unit 708 is further configured to, in accordance with a determination that the primary user intent does not comprise a user intent to narrow the primary media search query, determine (e.g., with determining unit 714) one or more secondary user intents based on the primary user intent and one or more previous user intents, the one or more previous user intents corresponding to one or more previous media-related requests received prior to the media-related request. Processing unit 708 is further configured to generate (e.g. with obtaining unit 718), one or more secondary media search queries that correspond to the one or more secondary user intents. Processing unit 708 is further configured to perform (e.g., with obtaining unit 718) the one or more secondary media search queries to obtain one or more secondary sets of media items. Processing unit 708 is further configured to display (e.g., with display enabling unit 710) the one or more secondary sets of media items on the display unit.

In some examples, the one or more previous media-related requests include a previous media-related request corresponding to the primary set of media items.

In some examples, processing unit 708 is further configured to determine (e.g., with determining unit 714) one or more combinations of the primary user intent and the one or more previous user intents, where each of the one or more combinations is associated with at least one media item, and where the one or more secondary intents comprise the one or more combinations.

In some examples, the one or more previous user intents and the primary user intent are associated with a same interactive session with the digital assistant. In some examples, the one or more secondary user intents are generated based on a media search history of a user on the one or more electronic devices. In some examples, the one or more secondary user intents are generated based on a media selection history of a user on the one or more electronic devices, the media selection history.

In some examples, processing unit 708 is further configured to receive (e.g., with receiving unit 722) a media search history from a second electronic device (e.g., via communication unit). The one or more secondary user intents are generated based on the media search history received from the second electronic device.

In some examples, the one or more secondary user intents are generated based on a media watch list of a user on the one or more electronic devices. In some examples, a plurality of text is displayed on the display unit while receiving the audio input, the plurality of text is associated with a plurality of media items displayed on the display unit while receiving the audio input, and the one or more secondary user intents are generated based on the displayed plurality of text.

In some examples, processing unit 708 is further configured to determine (e.g., with determining unit 714) a ranking score for each of the one or more secondary user intents, where the one or more secondary sets of media items are displayed in accordance with the ranking score for each of the one or more secondary user intents.

In some examples, the ranking score for each of the one or more secondary user intents is based on a time at which each of the media-related requests and the one or more previous media-related requests was received. In some examples, the ranking score for each of the one or more secondary user intents is based on a media search history of a user on the one or more electronic devices. In some examples, the ranking score for each of the one or more secondary user intents is based a media selection history of a user on the one or more electronic devices. In some examples, the ranking score for each of the one or more secondary user intents is based on a media watch list of a user on the one or more electronic devices.

In some examples, processing unit 708 is further configured to, in accordance with a determination that the primary user intent does not comprise a user intent to perform a new media search query, determine (e.g., with determining unit 714) whether the primary user intent comprises a user intent to correct a portion of the primary media search query. Processing unit 708 is further configured to, in accordance with a determination that the primary user intent comprises a user intent to correct a portion of the primary media search query, generate (e.g., with obtaining unit 718), based on the media-related request and the primary media search query request, a fifth primary media search query that corresponds to the primary user intent. Processing unit 708 is further configured to perform (e.g., with obtaining unit 718) the fifth primary media search query to obtain a fifth primary set of media items. Processing unit 708 is further configured to replace display of the primary set of media items on the display unit with display of the fifth primary set of media items (e.g., with display enabling unit 710).

In examples, determining whether the primary user intent comprises a user intent to correct a portion of the primary media search query comprises determining whether the media-related request includes a word or phrase corresponding to a user intent to correct a portion of the primary media search query. In some examples, determining whether the primary user intent comprises a user intent to correct a portion of the primary media search query comprises determining whether a sequence of phonemes representing a portion of the media-related request is substantially similar to a sequence of phonemes representing a portion of a previous media-related request that corresponds to the primary media search query.

In some examples, generating the fifth primary media search query comprises identifying a set of media items associated with a portion of the primary media search query that is not to be corrected, where the fifth primary media search query is generated based on one or more parameter values of the set of media items associated with the portion of the primary media search query that is not to be corrected.

In some examples, processing unit 708 is further configured to, in accordance with a determination that the primary user intent comprises a user intent to correct a portion of the primary media search query, excluding (e.g., with excluding unit 724) the primary media search query from consideration when determining a secondary user intent corresponding to the media-related request.

In some examples processing unit 708 is further configured to, in accordance with a determination that the primary user intent does not comprise a user intent to correct a portion of the primary media search query, determine (e.g., with determining unit 714) whether the primary user intent comprises a user intent to change a focus of a user interface displayed on the display unit, wherein the user interface includes a plurality of media items. Processing unit 708 is further configured to, in accordance with a determination that the primary user intent comprises a user intent to change a focus of a user interface displayed on the display unit, change (e.g., with display enabling unit 710) a focus of the user interface from a first media item of the plurality of media items to a second media item of the plurality of media items.

In some examples, determining whether the primary user intent comprises a user intent to change a focus of a user interface displayed on the display unit comprises determining whether the media-related request includes a word or phrase corresponding to a user intent to change a focus of a user interface displayed on the display unit.

In some example, the user interface includes a plurality of text corresponding to the plurality of media items in the user interface, and wherein the determination of whether the primary user intent comprises a user intent to change a focus of a user interface displayed on the display unit is based on the plurality of text.

In some examples, processing unit 708 is further configured to determine (e.g., with determining unit 714) a text representation of the media-related request and display (e.g., with displaying enabling unit 710) the text representation on the display unit. In some examples, the text representation is determined using one or more language models. In some examples, the one or more language models are biased towards media-related text results. In some examples, the one or more language models are configured to recognize media-related text in multiple languages.

In some examples, a plurality of media items and text associated with the plurality of media items are displayed on the display unit. Processing unit 708 is further configured to generate (e.g., with generating unit 726) a second language model using the text associated with the plurality of media items, where the text representation is determined using the second language model.

In some examples, processing unit 708 is further configured to determine (e.g., with determining unit 714), using the text representation, a predicted text and display (e.g., with display enabling unit 710), on the display unit, the predicted text with the text representation.

In some examples, the predicted text is determined based on text displayed on the display unit while receiving the audio input.

In some examples, processing unit 708 is further configured to, determine (e.g., with determining unit 714) whether an end-point of the audio input is detected after displaying the predicted text, where in accordance with a determination that an end-point of the audio input is detected after displaying the predicted text, the text representation and the predicted text is used to determine the primary user intent.

In some examples, processing unit 708 is further configured to, while receiving the audio input, determine (e.g., with determining unit 714) a preliminary user intent based on a received portion of the audio input, identify (e.g., with identifying unit 720) data that is required to fulfill the preliminary user intent, determine (e.g., with determining unit 714) whether the data is stored on the one or more electronic devices at a time the preliminary user intent is determined, and in accordance with a determination that the data is not stored on the one or more electronic devices at the time the preliminary user intent is determined, obtain (e.g., with obtaining unit 718) the data.

In accordance with some embodiments, processing unit 708 is configured to receive (e.g., at input unit 703 or audio receiving unit 704, and using receiving unit 722 or audio receiving enabling unit 716), from a user, a media search request in natural language speech form. Processing unit 708 is further configured to determine (e.g., with determining unit 714) a primary user intent corresponding to the media search request. obtaining a primary set of media items in accordance with the primary user intent. Processing unit 708 is further configured to determine (e.g., with determining unit 714) whether one or more previous user intents exist, where the one or more previous user intents corresponds to one or more previous media search requests received prior to the media search request. Processing unit 708 is further configured to, in response to determining that one or more previous user intents exist, determine (e.g., with determining unit 714) one or more secondary user intents based on the primary user intent and the one or more previous user intents. Processing unit 708 is further configured to obtain (e.g., with obtaining unit 718) a plurality of secondary sets of media items, wherein each secondary set of media items corresponds to a respective secondary user intent of the one or more secondary user intents. Processing unit 708 is further configured to display (e.g., with display enabling unit 710) the primary set of media items and the plurality of secondary sets of media items.

In some examples, determining the primary user intent further comprises determining whether the media search request contains an explicit request to narrow a previous media search request received prior to the media search request, where in accordance with a determination that the media search request contains an explicit request to narrow the previous media search request. The primary user intent is determined from the media search request and at least one of the one or more previous user intents.

In some examples, in response to determining that the media search request does not contain an explicit request to narrow the previous media search request, the primary user intent is determined from the media search request.

In some examples, the media search request is part of an interactive session with the digital assistant. Determining whether one or more previous user intents exist further comprises determining whether the interactive session includes one or more previous media search requests received prior to the media search request, wherein the one or more previous media search requests correspond to one or more previous user intents. In accordance with a determination that the interactive session contains one or more previous media search requests received prior to the media search request, a determination is made that one or more previous user intents. In accordance with a determination that the interactive session does not contain one or more previous media search requests received prior to the media search request, a determination is made that one or more previous user intents do not exist.

In some examples, processing unit 708 is further configured to, in response to determining that one or more previous media user intents do not exist, display (e.g., with display enabling unit 710) the primary set of media items.

In some examples, a secondary user intent of the one or more secondary user intents include a combination of the primary user intent and a previous user intent of the one or more previous user intents.

In some examples, a secondary user intent of the one or more secondary user intents include a combination of a first previous user intent of the one or more previous user intents and a second previous user intent of the one or more previous user intents.

In some examples, determining one or more secondary user intents further comprises generating a plurality of combinations of the primary user intent and the one or more previous user intents.

In some examples, determining one or more secondary user intents further comprises determining whether the plurality of combinations includes a combination that cannot be merged. In accordance with a determination that the plurality of combinations includes a user intent combination that cannot be merged, the one or more secondary user intents do not include the combination that cannot be merged.

In some examples, the combination that cannot be merged includes more than one value for a parameter that requires a singular value.

In some examples, determining one or more secondary user intents further comprises determining whether the one or more previous user intents include an incorrect user intent. In accordance with a determination that the one or more previous user intents include an incorrect user intent. The one or more secondary user intents are not based on the incorrect user intent.

In some examples, determining whether the one or more previous user intents include an incorrect user intent comprises determining whether the one or more previous user intents include a third user intent to correct a fourth user intent of the one or more previous user intents. In accordance with a determination that the one or more previous user intents include a third user intent to correct a fourth user intent of the one or more previous user intents, a determination is made that the one or more previous user intents include an incorrect user intent. The fourth user intent is determined to be the incorrect user intent.

In some examples, determining whether the one or more previous user intents include an incorrect user intent comprises determining whether the one or more previous user intents include a fifth user intent associated with a user selection of a media item that is inconsistent with the fifth user intent. In accordance with a determination that the one or more previous user intents include a third user intent to correct the incorrect user intent, a determination is made that the one or more previous user intents include an incorrect user intent, where the fifth user intent is determined to be the incorrect user intent.

In some examples, processing unit 708 is further configured to determine (e.g., with determining unit 714) whether the plurality of combinations includes a combination that is associated with less than a predetermined number of media items. In accordance with a determination that the plurality of combinations includes a combination that is associated with less than a predetermined number of media items, the one or more secondary user intents do not include the combination that is associated with less than a predetermined number of media items.

In some examples, processing unit 708 is further configured to determine (e.g., with determining unit 714) a ranking score for each of the one or more secondary user intents, where the plurality of secondary sets of media items are displayed in accordance with the ranking score for each of the one or more secondary user intents.

In some examples, the ranking score for each of the one or more secondary user intents is determined based on an order in which the media search request and the one or more previous media search requests are received. In some examples, the ranking score for each of the one or more secondary user intents is determined based on a selection history of the user, the selection history comprising media items previously selected by the user. In some examples, the ranking score for each of the one or more secondary user intents is determined based on a media search history of the user.

In some example, the primary set of media items are displayed at a top row of a user interface, the plurality of secondary set of media items are displayed in subsequent rows of the user interface, the subsequent rows being below the top row, and each row of the subsequent rows corresponds to a respective secondary user intent of the one or more secondary user intents.

In some examples, the subsequent rows are ordered in accordance with the ranking score of each of the one or more secondary user intents.

In accordance with some embodiments, processing unit 708 is configured to receive (e.g., at input unit 703 or audio receiving unit 704 and with receiving unit 722 or audio receiving enabling unit 716) a first media search request. Processing unit 708 is further configured to obtain (e.g., with obtaining unit 718) a first set of media items that satisfies the media search request. Processing unit 708 is further configured to display (e.g., with display enabling unit), on a display unit, the first set of media items via a user interface. While displaying the at least a portion of the first set of media items, processing unit 708 is further configured to receive (e.g., at input unit 703 or audio receiving unit 704 and with receiving unit 722 or audio receiving enabling unit 716) a second media search request and obtain (e.g., obtaining unit 718) a determination of whether the second media search request is a request to narrow the first media search request. Processing unit 708 is further configured to, in response to obtaining a determination that the second media search request is a request to narrow the first media search request, obtain (e.g., with obtaining unit 718) a second set of media items that satisfies the second media search request, the second set of media items being a subset of the plurality of media items, and replace display of at least a portion of the first set of media items on the display unit with display of at least a portion of the second set of media items via the user interface (e.g., with display enabling unit 710).

In some example, each media item of the second set of media items is associated with one or more parameter values of the first media search request and one or more parameter values of the second media search request.

In some examples, processing unit 708 is further configured to display (e.g., with display enabling unit 710) media content on the display unit while displaying the first set of media items and while displaying the at least a portion of the second set of media items.

In some example, the user interface occupies at least a majority of a display area of the display unit. Processing unit 708 is further configured to obtain (e.g., obtaining unit 718) a third set of media items that at least partially satisfies the second media search request, where the second set of media items and the third set of media items are different. Processing unit 708 is further configured to display (e.g., with display enabling unit 710), on the display unit, at least a portion of the third set of media items via the user interface.

In some examples, each media item of the third set of media items is associated with at least one parameter value defined in the first media search request or the second media search request. In some examples, the at least a portion of the second set of media items is displayed at a top row of the user interface, and wherein the at least a portion of the third set of media items is displayed at one or more subsequent rows on the user interface.

In some examples, a focus of the user interface is on a media item of the first set of media items when the second media search request is received, and the third set of media items are contextually-related to the media item of the first set of media items.

In some examples, obtaining a determination of whether the second media search request is a request to narrow the media search request comprises obtaining a determination of whether the second media search request contains one of a plurality of refinement terms.

In some examples, the second media search request is in natural language form. In some examples, the second media search request defines a parameter value using an ambiguous term.

In some examples, processing unit 708 is further configured to identiful (e.g., with identifying unit 720), using natural language processing, the parameter value based on a strength of a connection between the ambiguous term and the parameter value.

In some examples, each media item of the first set of media items is associated with a quality rating, and the second media search request defines a parameter value associated with the quality rating. In some examples, each media item of the first set of media items is associated with a duration, and wherein the second media search request defines a parameter value associated with the duration.

In some examples, each media item of the first set of media items is associated with a popularity rating, and the second media search request defines a parameter value associated with the popularity rating.

In some examples, each media item of the first set of media items is associated with a release date, and the second media search request defines a parameter value associated with the release date.

In some examples, processing unit 708 is further configured to, in response to obtaining a determination that the second media search request is not a request to narrow the first media search request, obtain (e.g., with obtaining unit 718) a fourth set of media items that satisfies the second media search request, the fourth set of media items being different from the first set of media items, and replace display of at least a portion of the first set of media items on the display unit with display of at least a portion of the fourth set of media items via the user interface (e.g., with display enabling unit 710).

In some examples, each media item of the fourth set of media items is associated with one or more parameters defined in the second media search request.

In some examples, processing unit 708 is further configured to display (e.g., with display enabling unit 710) media content on the display unit while displaying the first set of media items and while displaying the at least a portion of the fourth set of media items.

In some examples, the user interface occupies at least a majority of a display area of the display unit. Processing unit 708 is further configured to obtain (e.g., with obtaining unit 718) a fifth set of media items, where each media item of the fifth set of media items is associated with one or more parameters defined in the first media search request and one or more parameters defined in the second media search request. Processing unit 708 is further configured to display (e.g., with display enabling unit 710) the fifth set of media items on the display unit via the user interface.

In some examples, a focus of the user interface is on a second media item of the first set of media items when the second media search request is received, and one or more media items of the fifth plurality of media items includes a parameter value associated with the second media item of the first set of media items.

In some examples, a focus of the user interface is on a third media item of the first set of media items when the second media search request is detected. Processing unit 708 is further configured to, in response to obtaining a determination that the second media search request is not a request to narrow the first media search request, obtain (e.g., with obtaining unit 718) a determination of whether the second media search request is a request to obtain an alternative set of media items similar to the third media item of the first set of media items. Processing unit 708 is further configured to, in response to obtaining a determination that the second media search request is a request to obtain an alternative set of media items similar to the third media item of the first set of media items, obtain (e.g., with obtaining unit 718) a sixth set of media items, where each media item of the sixth set of media items is associated with one or more parameter values of the third media item, and display (e.g., with display enabling unit 710), on the display unit, the sixth set of media items via the user interface.

In some examples, the first set of media items is obtained by performing a string search based on the first media search request, and the second set of media items is obtained by performing a structured search based on one or more parameter values defined in the second media search request.

In some examples, the first media search request is received via a keyboard interface, and the second media search request is received in natural language speech form. In some examples, the structured search is performed using the first set of media items.

The operations described above with reference to FIGS. 5A-E are, optionally, implemented by components depicted in FIGS. 1-3 and 4A-B. For example, displaying operations 502, 522, 534, 540, 548, 564, 568, detecting operation 504, determining operations 508, 510, 538, 544, 550, 552, 560, obtaining operations 520, 524, 536, 546, 562, 566, identifying operations 526, 528, 542, 554, excluding operation 558, and generating operations 530, 556 may be implemented by one or more of operating system 252, GUI module 256, applications module 262, I/O processing module 428, STT processing module 430, natural language processing module 432, task flow processing module 436, service processing module 438, or processor(s) 204, 404. It would be clear to a person having ordinary skill in the art how other processes can be implemented based on the components depicted in FIGS. 1-3 and 4A-B.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device (e.g., a portable electronic device) is provided that comprises means for performing any of the methods described herein.

In accordance with some implementations, an electronic device (e.g., a portable electronic device) is provided that comprises a processing unit configured to perform any of the methods described herein.

In accordance with some implementations, an electronic device (e.g., a portable electronic device) is provided that comprises one or more processors and memory storing one or more programs for execution by the one or more processors, the one or more programs including instructions for performing any of the methods described herein.

Although the foregoing description uses terms "first," "second," etc. to describe various elements, these elements should not be limited by the terms. These terms are only used to distinguish one element from another. For example, a first user input could be termed a second user input, and, similarly, a second user input could be termed a first user input, without departing from the scope of the various described embodiments.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Further, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims In addition, in any of the various examples discussed herein, various aspects can be personalized for a particular user. User data including contacts, preferences, location, favorite media, and the like can be used to interpret voice commands and facilitate user interaction with the various devices discussed herein. The various processes discussed herein can also be modified in various other ways according to user preferences, contacts, text, usage history, profile data, demographics, or the like. In addition, such preferences and settings can be updated over time based on user interactions (e.g., frequently uttered commands, frequently selected applications, etc.). Gathering and use of user data that is available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data as private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select not to provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A non-transitory computer-readable storage medium storing one or more programs, the one or more programs including instructions, which when executed by one or more processors of an electronic device, cause the electronic device to:
    receive a first media search request;
    obtain a first set of media items that satisfies the first media search request, wherein each media item of the first set of media items is associated with one or more parameter values;
    display, on a display, at least a portion of the first set of media items via a user interface;
    while displaying, on the display, the at least a portion of the first set of media items, receive a second media search request, wherein a focus of the user interface is on a media item of the first set of media items when the second media search request is received;
    in accordance with a determination that the second media search request is a request to obtain an alternative set of media items similar to the media item of the first set of media items:
        obtain a second set of media items, wherein one or more media items of the second set of media items is associated with one or more parameter values associated with the media item of the first set of media items; and
        concurrently display, on the display, at least a portion of the first set of media items and at least a portion of the second set of media items via the user interface.

2. The non-transitory computer-readable storage medium of claim 1, wherein the determination that the second media search request is a request to obtain an alternative set of media items similar to the media item of the first set of media items is based on the focus of the user interface being on the media item of the first set of media items.

3. The non-transitory computer-readable storage medium of claim 2, wherein the determination that the second media search request is a request to obtain an alternative set of media items similar to the media item of the first set of media items is further based on a determination that a textual representation of the second media search request includes one or more words referring to the media item of the first set of media items.

4. The non-transitory computer-readable storage medium of claim 3, wherein the user interface includes a textual representation of the one or more words referring to the media item of the first set of media items.

5. The non-transitory computer-readable storage medium of claim 1, wherein the first set of media items is obtained by performing a string search based on the first media search request, and wherein the second set of media items is obtained by performing a structured search based on the one or more parameter values associated with the media item of the first set of media items.

6. The non-transitory computer-readable storage medium of claim 5, wherein the structured search is further based on one or more additional parameter values defined in the first media search request.

7. The non-transitory computer-readable storage medium of claim 5, wherein the structured search is performed using the first set of media items.

8. The non-transitory computer-readable storage medium of claim 1, wherein concurrently displaying, on the display, the at least a portion of the first set of media items and the at least a portion of the second set of media items via the user interface comprises:
    displaying the at least a portion of the second set of media items on a top row of the user interface; and
    displaying the at least a portion of the first set of media items on one or more subsequent rows of the user interface.

9. The non-transitory computer-readable storage medium of claim 8, wherein the one or more programs include further instructions, which when executed by the one or more processors of the electronic device, cause the electronic device to:
    display media content on the display while displaying the at least a portion of the first set of media items and the at least a portion of the second set of media items.

10. The non-transitory computer-readable storage medium of claim 1, wherein the first media search request is received via a keyboard interface, and wherein the second media search request is a natural language user speech input.

11. The non-transitory computer-readable storage medium of claim 1, wherein the one or more programs include further instructions, which when executed by the one or more processors of the electronic device, cause the electronic device to:
    after receiving the second media search request, determine whether the second media search request is a request to narrow the first media search request; and
    in accordance with a determination that the second media search request is not a request to narrow the first media search request, determine whether the second media search request is a request to obtain an alternative set of media items similar to the media item of the first set of media items.

12. The non-transitory computer-readable storage medium of claim 11, wherein the one or more programs include further instructions, which when executed by the one or more processors of the electronic device, cause the electronic device to:
in accordance with a determination that the second media search request is a request to narrow the first media search request:
obtain a third set of media items that satisfies the second media search request, the third set of media items being a subset of the first set of media items; and
concurrently display, on the display, the at least a portion of the first set of media items and at least a portion of the third set of media items via the user interface.

13. The non-transitory computer-readable storage medium of claim 12, wherein determining whether the second media search request is a request to narrow the first media search request comprises determining whether a textual representation of the second media search request includes one of a plurality of refinement terms.

14. The non-transitory computer-readable storage medium of claim 12, wherein one or more media items of the third set of media items is associated with one or more additional parameter values defined in the first media search request and one or more further additional parameter values defined in the second media search request.

15. The non-transitory computer-readable storage medium of claim 12, wherein concurrently displaying, on the display, the at least a portion of the first set of media items and the at least a portion of the third set of media items via the user interface comprises:
displaying the at least a portion of the third set of media items on a top row of the user interface; and
displaying the at least a portion of the first set of media items on one or more subsequent rows of the user interface.

16. An electronic device for operating a digital assistant of a media system, the electronic device comprising:
one or more processors; and
memory storing one or more programs, the one or more programs including instructions, which when executed by the one or more processors of the electronic device, cause the electronic device to:
receive a first media search request;
obtain a first set of media items that satisfies the first media search request, wherein each media item of the first set of media items is associated with one or more parameter values;
display, on a display, at least a portion of the first set of media items via a user interface;
while displaying, on the display, the at least a portion of the first set of media items, receive a second media search request, wherein a focus of the user interface is on a media item of the first set of media items when the second media search request is received;
in accordance with a determination that the second media search request is a request to obtain an alternative set of media items similar to the media item of the first set of media items:
obtain a second set of media items, wherein one or more media items of the second set of media items is associated with one or more parameter values associated with the media item of the first set of media items; and
concurrently display, on the display, at least a portion of the first set of media items and at least a portion of the second set of media items via the user interface.

17. The electronic device of claim 16, wherein the determination that the second media search request is a request to obtain an alternative set of media items similar to the media item of the first set of media items is based on the focus of the user interface being on the media item of the first set of media items.

18. The electronic device of claim 17, wherein the determination that the second media search request is a request to obtain an alternative set of media items similar to the media item of the first set of media items is further based on a determination that a textual representation of the second media search request includes one or more words referring to the media item of the first set of media items.

19. The electronic device of claim 18, wherein the user interface includes a textual representation of the one or more words referring to the media item of the first set of media items.

20. The electronic device of claim 16, wherein the first set of media items is obtained by performing a string search based on the first media search request, and wherein the second set of media items is obtained by performing a structured search based on the one or more parameter values associated with the media item of the first set of media items.

21. The electronic device of claim 20, wherein the structured search is further based on one or more additional parameter values defined in the first media search request.

22. The electronic device of claim 20, wherein the structured search is performed using the first set of media items.

23. The electronic device of claim 16, wherein concurrently displaying, on the display, the at least a portion of the first set of media items and the at least a portion of the second set of media items via the user interface comprises:
displaying the at least a portion of the second set of media items on a top row of the user interface; and
displaying the at least a portion of the first set of media items on one or more subsequent rows of the user interface.

24. The electronic device of claim 23, wherein the one or more programs include further instructions, which when executed by the one or more processors of the electronic device, cause the electronic device to:
display media content on the display while displaying the at least a portion of the first set of media items and the at least a portion of the second set of media items.

25. The electronic device of claim 16, wherein the first media search request is received via a keyboard interface, and wherein the second media search request is a natural language user speech input.

26. The electronic device of claim 16, wherein the one or more programs include further instructions, which when executed by the one or more processors of the electronic device, cause the electronic device to:
after receiving the second media search request, determine whether the second media search request is a request to narrow the first media search request; and
in accordance with a determination that the second media search request is not a request to narrow the first media search request, determine whether the second media search request is a request to obtain an alternative set of media items similar to the media item of the first set of media items.

27. The electronic device of claim 26, wherein the one or more programs include further instructions, which when executed by the one or more processors of the electronic device, cause the electronic device to:
- in accordance with a determination that the second media search request is a request to narrow the first media search request:
  - obtain a third set of media items that satisfies the second media search request, the third set of media items being a subset of the first set of media items; and
  - concurrently display, on the display, the at least a portion of the first set of media items and at least a portion of the third set of media items via the user interface.

28. The electronic device of claim 27, wherein determining whether the second media search request is a request to narrow the first media search request comprises determining whether a textual representation of the second media search request includes one of a plurality of refinement terms.

29. The electronic device of claim 27, wherein one or more media items of the third set of media items is associated with one or more additional parameter values defined in the first media search request and one or more further additional parameter values defined in the second media search request.

30. The electronic device of claim 27, wherein concurrently displaying, on the display, the at least a portion of the first set of media items and the at least a portion of the third set of media items via the user interface comprises:
- displaying the at least a portion of the third set of media items on a top row of the user interface; and
- displaying the at least a portion of the first set of media items on one or more subsequent rows of the user interface.

31. A method for operating a digital assistant of a media system, the method comprising: at one or more electronic devices comprising one or more processors and memory:
- receiving a first media search request;
- obtaining a first set of media items that satisfies the first media search request, wherein each media item of the first set of media items is associated with one or more parameter values;
- displaying, on a display, at least a portion of the first set of media items via a user interface;
- while displaying, on the display, the at least a portion of the first set of media items, receiving a second media search request, wherein a focus of the user interface is on a media item of the first set of media items when the second media search request is received;
- in accordance with a determination that the second media search request is a request to obtain an alternative set of media items similar to the media item of the first set of media items:
  - obtaining a second set of media items, wherein one or more media items of the second set of media items is associated with one or more parameter values associated with the media item of the first set of media items; and
  - concurrently displaying, on the display, at least a portion of the first set of media items and at least a portion of the second set of media items via the user interface.

32. The method of claim 31, wherein the determination that the second media search request is a request to obtain an alternative set of media items similar to the media item of the first set of media items is based on the focus of the user interface being on the media item of the first set of media items.

33. The method of claim 32, wherein the determination that the second media search request is a request to obtain an alternative set of media items similar to the media item of the first set of media items is further based on a determination that a textual representation of the second media search request includes one or more words referring to the media item of the first set of media items.

34. The method of claim 33, wherein the user interface includes a textual representation of the one or more words referring to the media item of the first set of media items.

35. The method of claim 31, wherein the first set of media items is obtained by performing a string search based on the first media search request, and wherein the second set of media items is obtained by performing a structured search based on the one or more parameter values associated with the media item of the first set of media items.

36. The method of claim 35, wherein the structured search is further based on one or more additional parameter values defined in the first media search request.

37. The method of claim 35, wherein the structured search is performed using the first set of media items.

38. The method of claim 31, wherein concurrently displaying, on the display, the at least a portion of the first set of media items and the at least a portion of the second set of media items via the user interface comprises:
- displaying the at least a portion of the second set of media items on a top row of the user interface; and
- displaying the at least a portion of the first set of media items on one or more subsequent rows of the user interface.

39. The method of claim 38, further comprising:
- displaying media content on the display while displaying the at least a portion of the first set of media items and the at least a portion of the second set of media items.

40. The method of claim 31, wherein the first media search request is received via a keyboard interface, and wherein the second media search request is a natural language user speech input.

41. The method of claim 31, further comprising:
- after receiving the second media search request, determining whether the second media search request is a request to narrow the first media search request; and
- in accordance with a determination that the second media search request is not a request to narrow the first media search request, determining whether the second media search request is a request to obtain an alternative set of media items similar to the media item of the first set of media items.

42. The method of claim 41, further comprising:
- in accordance with a determination that the second media search request is a request to narrow the first media search request:
  - obtaining a third set of media items that satisfies the second media search request, the third set of media items being a subset of the first set of media items; and
  - concurrently displaying, on the display, the at least a portion of the first set of media items and at least a portion of the third set of media items via the user interface.

43. The method of claim 42, wherein determining whether the second media search request is a request to narrow the first media search request comprises determining whether a textual representation of the second media search request includes one of a plurality of refinement terms.

44. The method of claim 42, wherein one or more media items of the third set of media items is associated with one or more additional parameter values defined in the first media search request and one or more further additional parameter values defined in the second media search request.

45. The method of claim 42, wherein concurrently displaying, on the display, the at least a portion of the first set of media items and the at least a portion of the third set of media items via the user interface comprises:
- displaying the at least a portion of the third set of media items on a top row of the user interface; and
- displaying the at least a portion of the first set of media items on one or more subsequent rows of the user interface.

\* \* \* \* \*